(12) United States Patent
Bennett et al.

(10) Patent No.: US 8,254,718 B2
(45) Date of Patent: Aug. 28, 2012

(54) MULTI-CHANNEL EDGE-AWARE CHROMINANCE NOISE REDUCTION

(75) Inventors: Eric P. Bennett, Kirkland, WA (US); Brad Hinkel, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 737 days.

(21) Appl. No.: 12/120,646

(22) Filed: May 15, 2008

(65) Prior Publication Data

US 2009/0285480 A1 Nov. 19, 2009

(51) Int. Cl.
*G06K 9/40* (2006.01)
(52) U.S. Cl. ........................................ 382/275; 382/167
(58) Field of Classification Search .......... 382/162–167, 382/254–275
See application file for complete search history.

(56) References Cited

U.S. PATENT DOCUMENTS

| | | | |
|---|---|---|---|
| 3,971,065 A | 7/1976 | Bayer | |
| 5,241,375 A | 8/1993 | Keen | |
| 6,980,326 B2 | 12/2005 | Tsuchiya et al. | |
| 7,082,218 B2 | 7/2006 | Pollard et al. | |
| 7,710,470 B2 * | 5/2010 | Kohashi | 348/241 |
| 2006/0008171 A1 * | 1/2006 | Petschnigg et al. | 382/254 |
| 2006/0226337 A1 | 10/2006 | Lim et al. | |
| 2006/0245666 A1 * | 11/2006 | Petrosyan et al. | 382/275 |
| 2007/0127836 A1 | 6/2007 | Subbotin | |
| 2007/0132865 A1 * | 6/2007 | Adams et al. | 348/242 |
| 2007/0153335 A1 | 7/2007 | Hosaka | |
| 2007/0172140 A1 | 7/2007 | Kokemohr | |
| 2008/0019601 A1 | 1/2008 | Amagai | |
| 2008/0027994 A1 | 1/2008 | Guan | |
| 2008/0123950 A1 * | 5/2008 | Matsushita et al. | 382/167 |
| 2008/0240602 A1 * | 10/2008 | Adams et al. | 382/266 |
| 2009/0148062 A1 * | 6/2009 | Gabso et al. | 382/266 |
| 2009/0278961 A1 * | 11/2009 | Mohanty et al. | 348/241 |

OTHER PUBLICATIONS

Choudhury, et al., "The Trilateral Filter for High Contrast Images and Meshes", Abstract of. Proc. of the Eurographics Symposium on Rendering, Per. H. Christensen and Daniel Cohen eds., Dated: 2003, p. 186.
"Dfine 1.0, Image Noise Reduction and Balancing Software, Plug-in for Image Editing Programs like Photoshop", http://www.samys.com/product_detail.php?item=9259.
Evening, "Reducing image noise", Focal Press, Movie 5 (Chapter 6& 11 extract), Adobe Photoshop CS2 for Photographers, Dated: 2005, pp. 1-5.
Bennett, et al., "Multispectral Bilateral Video Fusion", IEEE Transactions on Image Processing, vol. 16, No. 5, Dated: May 2007, pp. 1185-1194. Eisemann, et al., "Flash Photography Enhancement via Intrinsic Relighting", ACM Transactions on Graphics (TOG), vol. 23, Issue 3 (Aug. 2004), Special Issue: Proceedings of the 2004 SIGGRAPH Conference, Session: Flash & color, Year of Publication: 2004, pp. 673-678.
Petschnigg, et al., "Digital Photography with Flash and No-Flash Image Pairs", ACM Transactions on Graphics (TOG), vol. 23, Issue 3 (Aug. 2004), Special Issue: Proceedings of the 2004 SIGGRAPH Conference, Session: Flash & color, Year of Publication: 2004, pp. 664-672.
Tomasi, et al., "Bilateral Filtering for Gray and Color Images", Proceedings of the 1998 IEEE International Conference on Computer Vision, Bombay, India, Dated: 1998, pp. 839-846.

* cited by examiner

*Primary Examiner* — Jingge Wu

(57) ABSTRACT

Noise in an image is reduced in a manner that takes into account edge information in one or more channels of the image. A first image is received that is formatted according to a red-green-blue (RGB) color model. The first image is converted from the RGB color model to a second color model that includes at least a luminance channel, a first chrominance channel, and a second chrominance channel that are representative of the first image. The first and second chrominance channels are each denoised in a manner that accounts at least for edge information in the luminance channel, and may also include edge information from other channels in a manner that accounts for per-channel noise characteristics. The luminance channel and denoised first and second chrominance channels are converted to a second image formatted according to the RGB color model that is a noise-reduced version of the first image.

22 Claims, 9 Drawing Sheets

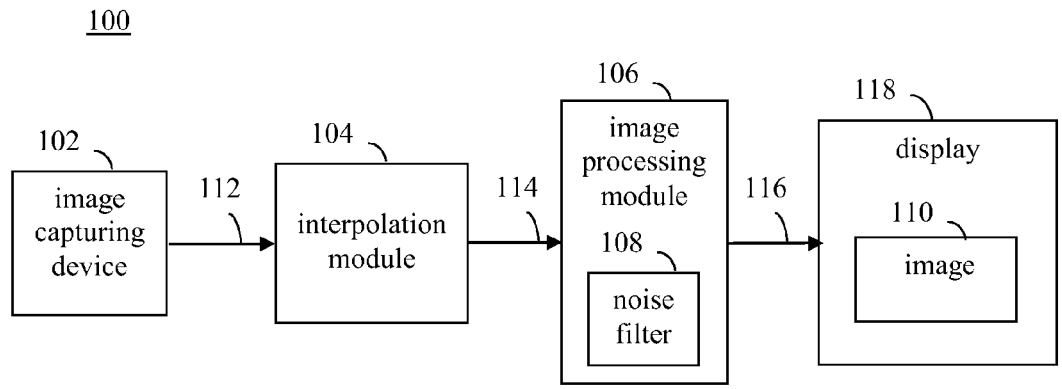
FIG. 1
$$\begin{bmatrix} Y \\ U \\ V \end{bmatrix} = \begin{bmatrix} .299 & .587 & .114 \\ .596 & -.275 & -.321 \\ .212 & -.523 & .311 \end{bmatrix} \begin{bmatrix} R \\ G \\ B \end{bmatrix}$$
FIG. 2
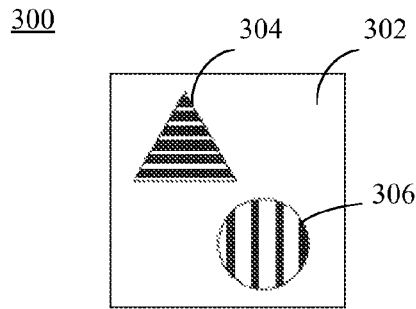
FIG. 3

900

902 convert a first image from a first color model to a second color model that includes at least a luminance channel, a first chrominance channel, and a second chrominance channel that are representative of the first image

904 denoise the first chrominance channel in a manner that accounts at least for edge information in at least one of the luminance channel or the second chrominance channel

906 denoise the second chrominance channel in a manner that accounts at least for edge information in at least one of the luminance channel or the first chrominance channel

908 convert the luminance channel, the denoised first chrominance channel, and the denoised second chrominance channel to a second image formatted according to the first color model

FIG. 9

MULTI-CHANNEL EDGE-AWARE CHROMINANCE NOISE REDUCTION

BACKGROUND

Digital photography is a type of photography that uses digital technology to make digital images of subjects. Digital image capturing devices, such as digital cameras, include sensors that capture images in a digital form. Examples of such sensors include charge coupled devices (CCDs) and CMOS (complementary metal-oxide-semiconductor) sensors. Digital images can be displayed, printed, stored, manipulated, transmitted, and archived without chemical processing.

A digital image capturing device typically includes a two-dimensional array of sensor elements organized into rows and columns. Such a sensor array may have any number of pixel sensors, including thousands or millions of pixel sensors. Each pixel sensor of the sensor array may be configured to be sensitive to a specific color, or color range, such as through the use of color filters. In one example, three types of pixel sensors may be present, including a first set of pixel sensors that are sensitive to the color red, a second set of pixel sensors that are sensitive to green, and a third set of pixel sensors that are sensitive to blue. One common example distribution of pixel sensors that are sensitive to red, green, or blue is called a Bayer pattern. In a Bayer pattern, 50% of the pixel sensors are configured to be sensitive to green, 25% of the pixel sensors are configured to be sensitive to red, and 25% of the pixel sensors are configured to be sensitive to blue. A set of red, green, and blue pixels captured according to a Bayer pattern may be processed and stored as a RGB (red-green-blue) color model image.

Many types of color models exist, including RGB, YUV, HSV, YIQ, and Lab color models. Many of such color models define an image in terms of a luminance channel and one or more chrominance channels, rather than in terms of channels that mix both luminance and chrominance together (as in RGB). For instance, according to the YUV and YIQ models, a color space is defined in terms of one luminance (Y) and two chrominance (UV) channels. The HSV model describes a color space as points in a cylinder, according to hue (chrominance), saturation (chrominance), and brightness (luminance). According to the Lab color model, a color space is defined in terms of one lightness component (L) and two color components (ab). Images according to these color models are typically digitally converted from a captured RGB image (or other chrominance-specific image model).

A problem in digital photography is that the color data, as seen in the chrominance channel(s) of an image, is often inaccurate. This problem is especially predominant with regard to images that were poorly illuminated when captured. As a result, the color data of such an image may be noisy. This inaccuracy in color data can result in undesirable color artifacts being present in images, particularly when the images are viewed at high levels of magnification. Relatively simple approaches for correcting this problem (e.g., by blurring the chrominance) can cause an image to be overly smoothed. More advanced edge-preserving approaches for correcting the problem can be applied, but may result in splotchy colors to be present in the output image that are even worse than the pre-corrected colors. This is because the edge-preserving filters must detect edges in the chrominance data to operate correctly, and their assumptions may be insufficiently robust when the color data is inaccurate. Thus, ways of improving the accuracy of color data in digital images are desired that do not blur and/or otherwise substantially reduce image quality.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Noise in an image is reduced in a manner that takes into account edge information in multiple channels of the image. An image may be represented in terms of one or more luminance channels, and/or one or more chrominance channels. Noise reduction may be performed on each channel of the image in a manner that takes into account edge information in one or more of the other chrominance and luminance channels of the image.

Methods for reducing image noise are described. In accordance with one implementation, a first image is received as a first set of data formatted according to a red-green-blue (RGB) color model. The first set of data is converted from the RGB color model to a second color model that includes at least a luminance channel, a first chrominance channel, and a second chrominance channel that are representative of the first image. The first chrominance channel and second chrominance channel are each denoised in a manner that accounts at least for edge information in the luminance channel. The luminance channel, the denoised first chrominance channel, and the denoised second chrominance channel are converted to a second set of data formatted according to the RGB color model that represents a second image.

In one example, the first chrominance channel is denoised in a manner that accounts for edge information in the luminance channel, and the second chrominance channel is denoised in a manner that accounts for edge information in the luminance channel. For instance, the first chrominance channel may be denoised by calculating a denoised chrominance value for each pixel of the first chrominance channel according to $$J_s^{C1} = \frac{\sum_{p=\Omega} g(\|p-s\|, \sigma_h) g(I_p^L - I_s^L, \sigma_i^L) I_p^{C1}}{\sum_{p=\Omega} g(\|p-s\|, \sigma_h) g(I_p^L - I_s^L, \sigma_i^L)},$$

where $I^{C1}$ is the first chrominance channel, $\Omega$ is a region of pixels of the first chrominance channel that includes a pixel s, p is a pixel located in the region of pixels $\Omega$, $I_p^{C1}$ is a chrominance value in the first chrominance channel for the pixel p, $I_p^L$ is a luminance value in the luminance channel for the pixel p, $I_s^L$ is a luminance value in the luminance channel for the pixel s, $J^{C1}$ is the denoised first chrominance channel image, $J_s^{C1}$ is the calculated denoised chrominance value of the pixel s, $\|p-s\|$ is an Euclidean distance between the pixel p and the pixel s, $\sigma_h$ is a spatial falloff parameter, $\sigma_i^L$ is an intensity falloff parameter for the luminance channel, and g( ) is a Gaussian distribution.

The second chrominance channel may be denoised in an analogous manner.

In another example, the first chrominance channel is denoised in a manner that accounts for edge information in the luminance channel and edge information in the first chrominance channel, and the second chrominance channel is denoised in a manner that accounts for edge information in the luminance channel and edge information in the second chrominance channel. For instance, the first chrominance channel may be denoised by calculating a denoised chrominance value for each pixel of the first chrominance channel according to $$J_s^{C1} = \frac{\sum_{p=\Omega} g(\|p-s\|, \sigma_h) g(I_p^L - I_s^L, \sigma_i^L) g(I_p^{C1} - I_s^{C1}, \sigma_i^{C1}) I_p^{C1}}{\sum_{p=\Omega} g(\|p-s\|, \sigma_h) g(I_p^L - I_s^L, \sigma_i^L) g(I_p^{C1} - I_s^{C1}, \sigma_i^{C1})},$$

where $I^{C1}$ is the first chrominance channel, $\Omega$ is a region of pixels of the first chrominance channel that includes a pixel s, p is a pixel located in the region of pixels $\Omega$, $I_p^{C1}$ is a chrominance value in the first chrominance channel for the pixel p, $I_p^L$ is a luminance value in the luminance channel for the pixel p, $I_s^L$ is a luminance value in the luminance channel for the pixel s, $J^{C1}$ is the denoised first chrominance channel image, $J_s^{C1}$ is the calculated denoised chrominance value of the pixel s, $\|p-s\|$ is an Euclidean distance between the pixel p and the pixel s, $\sigma_h$ is a spatial falloff parameter, $\sigma_i^L$ is an intensity falloff parameter for the luminance channel, and g( ) is a Gaussian distribution.

The second chrominance channel may be denoised in an analogous manner.

In another example, the first chrominance channel may be denoised in a manner that accounts for edge information in the luminance channel, edge information in the first chrominance channel, and edge information in the second chrominance channel, and the second chrominance channel may be denoised in a manner that accounts at least for edge information in the luminance channel, edge information in the first chrominance channel, and edge information in the second chrominance channel. For instance, the first chrominance channel may be denoised by calculating a denoised chrominance value for each pixel of the first chrominance channel according to $$J_s^{C1} = \frac{\sum_{p=\Omega} g(\|p-s\|, \sigma_h) g(I_p^L - I_s^L, \sigma_i^L) g(I_p^{C1} - I_s^{C1}, \sigma_i^{C1})}{\sum_{p=\Omega} g(\|p-s\|, \sigma_h) g(I_p^L - I_s^L, \sigma_i^L) g(I_p^{C1} - I_s^{C1}, \sigma_i^{C1})} \\ g(I_p^{C2} - I_s^{C2}, \sigma_i^{C2})$$

where $I^{C1}$ is the first chrominance channel, $\Omega$ is a region of pixels of the first chrominance channel that includes a pixel s, p is a pixel located in the region of pixels $\Omega$, $I_p^{C1}$ is a chrominance value in the first chrominance channel for the pixel p, $I_p^L$ is a luminance value in the luminance channel for the pixel p, $I_s^L$ is a luminance value in the luminance channel for the pixel s, $I_p^{C1}$ is a chrominance value in the first chrominance channel for the pixel p, $I_s^{C1}$ is a chrominance value in the first chrominance channel for the pixel s, $I_p^{C2}$ is a chrominance value in the second chrominance channel for the pixel p, $I_s^{C2}$ is a chrominance value in the second chrominance channel for the pixel s, $J^{C1}$ is the denoised first chrominance channel image, $J_s^{C1}$ is the calculated denoised chrominance value of the pixel s, $\|p-s\|$ is an Euclidean distance between the pixel p and the pixel s, $\sigma_h$ is a spatial falloff parameter, $\sigma_i^L$ is an intensity falloff parameter for the luminance channel, $\sigma_i^{C1}$ is an intensity falloff parameter for the first chrominance channel, $\sigma_i^{C2}$ is an intensity falloff parameter for the second chrominance channel, and g( ) is a Gaussian distribution.

The second chrominance channel may be denoised in an analogous manner.

In accordance with another implementation, a system for reducing noise in an image is provided. The system includes a first color model converter, a first chrominance channel filter, a second chrominance channel filter, and a second color model converter. The first color model converter is configured to receive a first image as a first set of data formatted according to a red-green-blue (RGB) color model, and to convert the first set of data from the RGB color model to a second color model that includes at least a luminance channel, a first chrominance channel, and a second chrominance channel that are representative of the first image. The first chrominance channel filter is configured to denoise the first chrominance channel in a manner that accounts at least for edge information in the luminance channel. The second chrominance channel filter is configured to denoise the second chrominance channel in a manner that accounts at least for edge information in the luminance channel. The second color model converter is configured to convert the luminance channel, the denoised first chrominance channel, and the denoised second chrominance channel to a second set of data formatted according to the RGB color model that is configured to form a second image.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

FIG. 1 shows an example digital image capturing system.

FIG. 2 shows a mapping matrix for mapping an image from a RGB color model to a YUV color model.

FIG. 3 shows an example image.

FIG. 9 shows a flowchart for noise filtering an image, according to an example embodiment.

Figure 4:
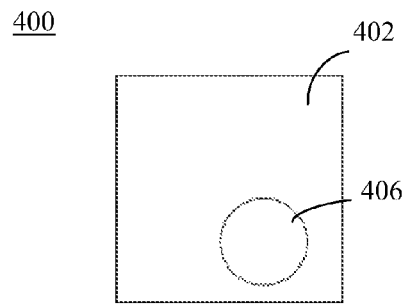
FIGS. 4-6 show example views of the Y, U, and V channels of the image of FIG. 3 when the image is represented according to the YUV color model.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

Introduction

The present specification discloses one or more embodiments that incorporate the features of the invention. The disclosed embodiment(s) merely exemplify the invention. The scope of the invention is not limited to the disclosed embodiment(s). The invention is defined by the claims appended hereto.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Example Image Noise Reduction Techniques

Digital photography is a type of photography that uses digital technology to capture digital images of subjects. Many types of devices are capable of capturing digital images, including digital cameras, cell phones, camcorders, web cameras, etc. Such digital images can be displayed, printed, stored, manipulated, transmitted, and archived without chemical processing.

FIG. 1 shows an example digital image capturing system 100. As shown in FIG. 1, system 100 includes an image capturing device 102, an interpolation module 104, an image processing module 106, and a display 118. Image capturing device 102, interpolation module 104, image processing module 106, and display 118 may be present together at a single device, or may be located in two or more separate devices. For example, in one implementation, image capturing device 102, interpolation module 104, image processing module 106, and display 118 may be included in a single device (e.g., a digital camera). In another implementation, image capturing device 102 and interpolation module 104 may be included in a first device (e.g., a digital camera), and image processing module 106 and display 118 may be included in a second device (e.g., a computer). These elements of system 100 are described as follows.

Image capturing device 102 may be a camera or other device that includes sensors configured to capture images in a digital form. Examples of such sensors include charge coupled devices (CCDs) and CMOS (complementary metal-oxide-semiconductor) sensors. For instance, image capturing device 102 may include a two-dimensional array of sensor elements organized into rows and columns. Such a sensor array may have any number of pixel sensors, including thousands or millions of pixel sensors. Each pixel sensor of the sensor array may be configured to be sensitive to a specific color, or color range, such as through the use of color filters. In one example, three types of pixel sensors may be present, including a first set of pixel sensors that are sensitive to the color red, a second set of pixel sensors that are sensitive to green, and a third set of pixel sensors that are sensitive to blue. One common example distribution of pixel sensors that are sensitive to red, green, or blue is called a Bayer pattern. In a Bayer pattern, 50% of the pixel sensors are configured to be sensitive to green, 25% of the pixel sensors are configured to be sensitive to red, and 25% of the pixel sensors are configured to be sensitive to blue. As shown in FIG. 1, image capturing device 102 generates Bayer pattern image data 112, which includes image data formatted according to the Bayer pattern.

Interpolation module 104 receives Bayer pattern image data 112. Interpolation module 104 is configured to generate image data according to a RGB (red-green-blue) color model (also known as "color space"), by interpolating red, green, and blue pixel data values from Bayer pattern image data 112 for each pixel position. In other words, interpolation module 104 is configured to generate a full pixel array (e.g., an array the size of the sensor array of device 102) for each of the colors of red, green, and blue. For instance, interpolation module 104 may perform the pixel interpolation using a class of methods commonly known as "demosaicers". As shown in FIG. 1, interpolation module 104 generates RGB image data 114, which includes image data formatted according to the RGB (red-green-blue) color model. RGB image data 114 includes a full two-dimensional array of image pixel data for each of red, green, and blue, referred to respectively as a red channel, a green channel, and a blue channel.

Note that device 102 may be configured to generate image data formatted according to color combinations other than red, green, and blue, including CYGM (cyan, yellow, green, magenta) or a RGBE (red, green, blue, emerald).

As shown in FIG. 1, image processing module 106 receives RGB image data 114. Image processing module 106 is configured to perform image processing on RGB image data 114. For example, image processing module 106 may be configured to perform image scaling, color correction, denoising, etc., on RGB image data 114. As shown in FIG. 1, image processing module 106 generates processed image data 116. Display 118 receives processed image data 116, and generates an image 110 corresponding to image data 116 for display.

Note that interpolation module 104 and image processing module 106 may be implemented in hardware, software, firmware, or any combination thereof. For example, interpolation module 104 and image processing module 106 may be implemented as computer code configured to be executed in one or more processors. Alternatively, interpolation module 104 and image processing module 106 may be implemented as hardware logic/electrical circuitry.

The majority of existing digital images are formatted according to the RGB color space, where the value of a pixel is a weighted combination of its three constituent color channels. This is because image capturing devices (e.g., image capturing device 102) typically capture images using red, green, and blue sensors, and because the captured images are eventually displayed on displays (e.g., display 118) such as CRTs and LCD (liquid crystal devices) that have red, green, and blue display elements. However, the human visual system is configured to perceive the concepts of luminance (how "bright" a pixel appears to be) and chrominance (what color a pixel appears to be). However, the red, green, and blue channels are not orthogonal to luminance and chrominance because by adjusting one of the three RGB channels, luminance and chrominance are simultaneously adjusted. Thus, to process images in a manner similar to the human visual system's perception, the RGB color model may be mapped into the luminance/chrominance color space according to further color models. Examples of such further color models include YUV, HSV, YIQ, Lab, and CIECAM.

According to the YUV and YIQ models, a color space is defined in terms of one luminance (Y) and two chrominance (UV) components. The HSV model describes a color space as points in a cylinder, according to hue (chrominance), saturation (chrominance), and brightness (luminance). According to the Lab color model, a color space is defined in terms of one lightness (luminance) component (L) and two color components (ab). The CIECAM02 model CIECAM02 defines correlates for yellow-blue, red-green, brightness (luminance), and colorfulness. HSV and YIQ, are not strictly perceptually-motivated, while Lab and CIECAM are perceptually-motivated.

A problem with digital images, such as image 110, is that the color data contained in the chrominance channels of the image is often inaccurate. This problem is especially predominant with regard to images capturing during poor illumination. As a result, the color data of an image may be noisy. This inaccuracy in color data can result in undesirable color artifacts being present in images, particularly when the images are viewed at high levels of magnification. Noise reduction ("denoising") may be performed by image processing module 106, particularly for images captured under such poor illumination conditions. However, a signal-to-noise ratio (SNR) of such images may be low due to a reduced number of photons that reach the image sensor during an exposure. Furthermore, because most image capturing devices use sensors based on the Bayer pattern, there is inherently less spatial information about red and blue than for green. This imbalance, combined with the fact that luminance is determined mostly by the green channel, results in chrominance being relatively noisier than the luminance.

As shown in FIG. 1, image processing module 106 may include a noise filter 108. Noise filter 108 may be configured to perform noise reduction ("denoising") on RGB image data 114, so that image 110 may be displayed with reduced noise. Noise filter 108 may be configured to perform relatively simple approaches for correcting this problem (e.g., blurring the colors with a Gaussian filter), which can cause an image to be overly smoothed. Alternatively, noise filter 108 may be configured to perform more advanced edge-preserving approaches for correcting this problem. However, such edge-preserving approaches may result in splotchy colors being present in the image that are even worse than the pre-corrected colors. This is because the edge-preserving filters must detect real edges in the chrominance data to operate correctly, and their assumptions may be insufficiently robust when the color data is inaccurate.

Example techniques for noise filtering are described as follows. In the following examples, the YUV color model is used as an example luminance/chrominance color space. As described above, the Y channel represents the luminance channel, while the U and V channels represent first and second chrominance channels. A mapping matrix 200 for mapping an image from the RGB space to the YUV space is shown in FIG. 2. Mapping matrix 200 generates Y, U, and V channels for a YUV color model image based on received red, green, and blue channels of an RGB color model image. Mapping matrix 200 is well known to persons skilled in the relevant art(s). Mapping matrix 200 performs the following equations to generate the Y, U, and V channel values from the red (R), green (G), and blue (B) channel values:

$$Y = 0.299 \times R + 0.587 \times G + 0.114 \times B \qquad \text{Equation 1}$$

$$U = 0.596 \times R - 0.275 \times G - 0.321 \times B \qquad \text{Equation 2}$$

$$V = 0.212 \times R - 0.523 \times G + 0.311 \times B \qquad \text{Equation 3}$$

FIG. 3 shows an example image 300. Image 300 is provided to help illustrate various noise reduction techniques described herein, and is not intended to be limiting. Image 300 may be stored in the form of an RGB color model image, a Y'UV color model image, or in the form of any other color model. As shown in FIG. 3, image 300 includes a triangle 304 and a circle 306 on a background 302. In the example of FIG. 3, triangle 304 is a first color (as indicated by the horizontal hatching), circle 306 is a second color (as indicated by the vertical hatching), and background 302 is gray.

Figure 5:
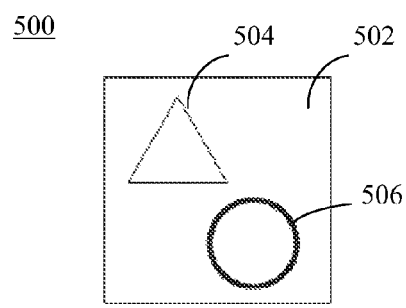
Figure 6:
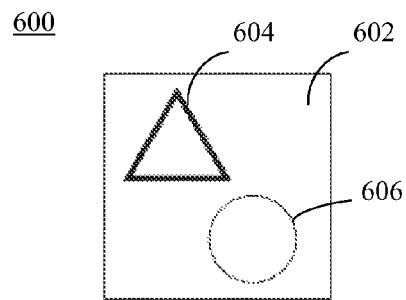

FIGS. 4-6 show views of the Y, U, and V channels of image 300 when image 300 is represented according to the Y'UV color model. FIG. 4 shows a luminance (Y) channel 400 for image 300. As shown in FIG. 4, luminance channel 400 includes a circle 406, which corresponds to circle 304 of image 300, and a background 402, which corresponds to background 302 of image 300. As indicated by the lack of a triangle in luminance channel 400 corresponding to triangle 304 in image 300, the first color (of triangle 304 in FIG. 3) has a luminance value close to that of the gray background (background 302 in FIG. 3), and thus does not show in FIG. 4. The presence of circle 406 in luminance channel 400 indicates that the second color (of circle 306 in FIG. 3) has a luminance value greater than that of the gray background (background 302 in FIG. 3), and thus is visible in FIG. 4.

FIG. 5 shows a first chrominance (U) channel 500 for image 300 of FIG. 3. As shown in FIG. 5, first chrominance channel 500 includes a triangle 504, which corresponds to triangle 304 of image 300, a circle 506, which corresponds to circle 306 of image 300, and a background 502, which corresponds to background 302 of image 300. Circle 506 is indicated in FIG. 5 as being darker than triangle 504 in first chrominance channel 500. The relative lightness of triangle 504 in FIG. 5 indicates that a color composition of the first color (of triangle 304 in FIG. 3) includes relatively less of the U channel chrominance. The relative darkness of circle 506 in second chrominance channel 500 indicates that a color composition of the second color (of circle 306 in FIG. 3) includes relatively more of the U channel chrominance (as compared to the first color).

FIG. 6 shows a second chrominance (V) channel 600 for image 300 of FIG. 3. As shown in FIG. 6, second chrominance channel 600 includes a triangle 604, which corresponds to triangle 304 of image 300, a circle 606, which corresponds to circle 306 of image 300, and a background 602, which corresponds to background 302 of image 300. Circle 606 is indicated in FIG. 6 as being lighter than triangle 604 in second chrominance channel 600. The relative darkness of triangle 604 in FIG. 6 indicates that a color composition of the first color (of triangle 304 in FIG. 3) includes relatively more of the V channel chrominance. The relative lightness of circle 606 in second chrominance channel 600 indicates that a color composition of the second color (of circle 306 in FIG. 3) includes relatively less of the V channel chrominance (as compared to the first color).

A basic form of noise reduction that may be performed by noise filter 108 on an image is the Gaussian filter, which is a "domain" filter in that it reduces noise by combining together spatially adjacent pixel values with a Gaussian distribution (also known as a "normal distribution") falloff. Gaussian filtering may be executed relatively quickly. However, the Gaussian filter generates blurring on the chrominance channels, particularly noticeable at higher levels of magnification, and decreases edge contrast by smoothing over regions that are desired to remain sharp after denoising. As a result, an image processed by a Gaussian filter may appear softer than before filtering.

Figure 7:
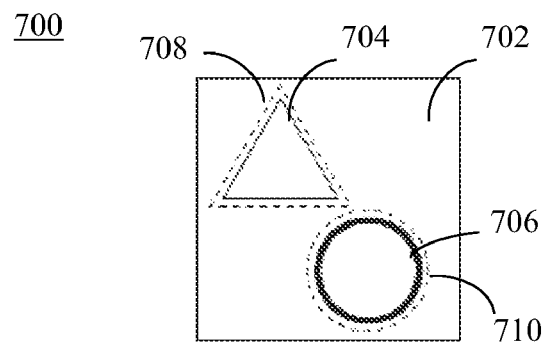
FIG. 7 shows an example Gaussian filtered U chrominance channel for the image shown in FIG. 3.

For example, FIG. 7 shows an example first chrominance channel 700 for image 300 that is a filtered version of first chrominance channel 500 shown in FIG. 5. In FIG. 7, first chrominance channel 700 has been Gaussian filtered. As shown in FIG. 7, first chrominance channel 700 includes a triangle 704, which corresponds to triangle 504 shown in FIG. 5, a circle 706, which corresponds to circle 506 shown in FIG. 5, and a background 702, which corresponds to background 502 shown in FIG. 5. Furthermore, first chrominance channel 700 includes a first blurred region 708 and a second blurred region 710. First blurred region 708 is located at an edge of triangle 704, and second blurred region 710 is located at an edge of circle 706. First blurred region 708 is due to blurring at the edge of triangle 704 caused by the Gaussian filter, and second blurred region 710 is due to blurring at the edge of circle 706 caused by the Gaussian filter.

Figure 8:
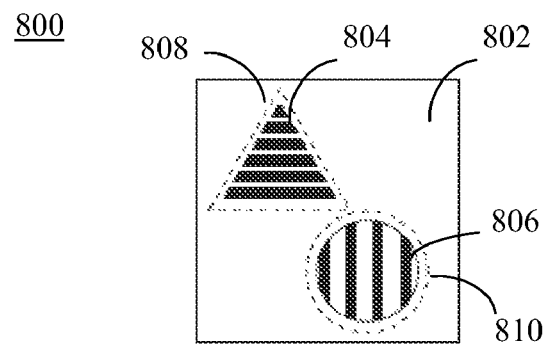
FIG. 8 shows an RGB color model image generated from the image of FIG. 3, where the image of FIG. 3 was converted to the YUV color space, was Gaussian filtered in the YUV color space, and was converted to the RGB color space.

FIG. 8 shows an example image 800, which is a version of image 300 shown in FIG. 3 that has been filtered according to a Gaussian filter. As shown in FIG. 8, image 800 includes a triangle 804, which corresponds to triangle 304 shown in FIG. 3, a circle 806, which corresponds to circle 306 shown in FIG. 3, and a background 802, which corresponds to background 302 shown in FIG. 3. Image 800 is a combination of a Gaussian filtered version of luminance channel 400 (FIG. 4), first chrominance channel 700, and a Gaussian filtered version of second chrominance channel 600 (FIG. 6). Due to the blurring in first chrominance channel 700 shown in FIG. 7, and further blurring that may have occurred while Gaussian filtering luminance channel 400 shown in FIG. 4 and/or second chrominance channel 600 shown in FIG. 6, image 800 includes a first blurred region 808 located at an edge of triangle 804, and a second blurred region 810 located at an edge of circle 806

Further forms of noise reduction that may be performed by noise filter 108, and which are configured to avoid over-smoothing, are referred to as "edge-preserving" techniques. Edge-preserving noise reduction techniques are intended to decrease noise by smoothing pixel values together that are positioned on a same side of an edge in an image. In this manner, generally smooth areas that are corrupted by noise become smoother, while large discontinuities due to actual edges are preserved.

One example of an edge-preserving form of noise reduction that may be performed by noise filter 108 is median filtering. A median filter generates a new pixel value for each pixel in an image based on an average pixel value of a region of pixels surrounding the pixel. A median filter preserves many edges, but also creates new erroneous edges, which may be distracting to the viewer. Because the Bayer pattern is demosaiced in a manner whereby a single color measurement is used to generate multiple pixel values, an incorrect sensor reading for a pixel can corrupt a sufficiently large number of pixels to generate a new chrominance edge. The median filter can make these "splotches" even more visible by sharpening them.

Another commonly used edge-preserving noise reduction technique is the bilateral filter, which is both a "domain" (spatial) and "range" (luminous intensity) filter. As such, the bilateral filter smoothes together nearby pixels of similar luminous intensity weighted by Gaussian distributions. Noise filter 108 may be configured to perform a bilateral filter on an input image according to Equation 4 shown as follows:

$$J_s = \frac{\sum_{p=\Omega} g(\|p-s\|, \sigma_h) g(I_p - I_s, \sigma_i) I_p}{\sum_{p=\Omega} g(\|p-s\|, \sigma_h) g(I_p - I_s, \sigma_i)} \quad \text{Equation 4}$$

where
 I is an image channel,
 $\Omega$ is a region of pixels of the image channel that includes a pixel s,
 p is a pixel located in the region of pixels $\Omega$,
 $I_p$ is a pixel value in the image channel for the pixel p,
 $I_s$ is a pixel value in the image channel for the pixel s,
 J is the denoised image channel,
 $J_s$ is the calculated denoised pixel value of the pixel s,
 $\|p-s\|$ is an Euclidean distance between the pixel p and the pixel s,
 $\sigma_h$ is a spatial falloff parameter, $\sigma_i$ is an intensity falloff parameter (e.g., a measure of how strong an edge is to be considered an edge), and g( ) is a Gaussian distribution, represented by Equation 5 shown below:

$$g(x, \sigma) \equiv \frac{1}{\sigma\sqrt{2\pi}} e^{\frac{-x^2}{2\sigma^2}} \quad \text{Equation 5}$$

Equation 4 may be performed by noise filter 108 on each channel of the input image. The Gaussian distribution portion of Equation 4 that includes $\sigma_h$ is the spatial filter portion, and the Gaussian distribution portion of Equation 4 that includes $\sigma_i$ is the luminous intensity filter portion. In the case of a YUV color model image, Equation 4 may be separately performed for each of the luminance (Y) channel, the first chrominance (U) channel, and the second chrominance (V) channel. Pixel s is typically a center pixel of the region of pixels Q. The region of pixels Q is typically a square region of pixels, such as a 3 by 3 region of pixels or a 5×5 region of pixels.

A disadvantage of the bilateral filter is that it can only successfully reduce image noise when the image noise is of a magnitude less than the magnitude of edges in the image. If the noise intensity is greater than the edge magnitude, the bilateral filter will preserve the noise in the same manner as edges are preserved, resulting in little to no denoising.

Techniques exist for overcoming the disadvantages of the bilateral filter. For example, a joint bilateral filter (also known as a cross bilateral filter) is a modification of the bilateral filter that is configured to denoise a first image using edges present in a less-noisy, aligned (registered) second image (which is often taken with a flash). Thus, the joint bilateral filter requires two images of the same subject to be captured. Noise filter 108 may be configured to perform the joint bilateral filter on an input image according to Equation 6 shown as follows:

$$J_s = \frac{\sum_{p=\Omega} g(\|p - s\|, \sigma_h) g(I'_p - I'_s, \sigma_i) I_p}{\sum_{p=\Omega} g(\|p - s\|, \sigma_h) g(I'_p - I'_s, \sigma_i)} \quad \text{Equation 6}$$

where

I is an image channel of the first image,

I' is a corresponding image channel of the second image,

I'$_p$ is a pixel value in the image channel of the second image for the pixel p, and I'$_s$ is a pixel value in the image channel of the second image for the pixel s.

Although an improvement over the bilateral filter, the joint bilateral filter requires a pair of images to be captured, with the second image being a well-exposed image captured at a different time from the first image.

The joint bilateral filter was extended to use information simultaneously captured in a second, better-exposed infrared (IR) spectrum image to reduce noise in a first RGB color model first image. However, this extended joint bilateral filter technique is not as straightforward as in the joint bilateral filter, because edges do not necessarily appear in the IR spectrum image due to differing inter-spectra material reflectance properties. Thus, a dual bilateral filter was developed that is configured to not inadvertently blur across visible-spectrum edges. According to the dual bilateral filter, the first (visible light) and second (IR) spectrum images may be simultaneously captured. Edges are detected in multiple spectra simultaneously, but intensity differences in noisier spectra are required to be more pronounced to be considered edges. This is accomplished by having an individual $\sigma_i$ parameter for each channel (which may be derived from noise statistics or may be manually set). Noise filter 108 may be configured to perform the dual bilateral filter on an input image according to Equation 7 shown as follows, for a YUV color model image:

$$J_s^Y = \frac{\sum_{p=\Omega} g(\|p - s\|, \sigma_h) g(I_p^Y - I_s^Y, \sigma_i^Y) g(I_p^{IR} - I_s^{IR}, \sigma_i^U) I_p^Y}{\sum_{p=\Omega} g(\|p - s\|, \sigma_h) g(I_p^Y - I_s^Y, \sigma_i^Y) g(I_p^{IR} - I_s^{IR}, \sigma_i^{IR})} \quad \text{Equation 7}$$

where $I^Y$ is the luminance (L) channel of the visible spectrum image, $I^{IR}$ is the IR channel of the IR image, $I_p^L$ is a pixel value in the luminance channel for the pixel p, $I_p^{IR}$ is a pixel value in the IR channel for the pixel p, $I_s^L$ is a pixel value in the luminance channel for the pixel s, $I_s^{IR}$ is a pixel value in the IR channel for the pixel s, $J^Y$ is the denoised luminance channel, $J_s^Y$ is the calculated denoised pixel value of the pixel s, $\sigma_i^L$ is an intensity falloff parameter for the luminance channel, and $\sigma_i^{IR}$ is an intensity falloff parameter for the IR channel.

To further improve the effectiveness of the dual bilateral filter, the luminance image $I^Y$ used for edge detection may be pre-processed with a 5×5 median filter to reduce the occurrence of false positive edges. The median filter is configured to determine a statistical median pixel value for the pixels with the 5×5 kernel window region.

Although an improvement over the joint bilateral filter, the dual bilateral filter still requires a pair of images to be captured. Furthermore, the second image is captured using different spectrum (IR) from the visible light spectrum. Visible image edges may not be present in the IR spectrum, and thus the IR spectrum may not provide useful edge information to aid in performing noise reduction without blurring visible image edges.

Embodiments of the present invention overcome deficiencies of conventional filters, such as the conventional forms of the bilateral filter, joint bilateral filter, and dual bilateral filter described above. Example embodiments of the present invention are described in the following section.

Example Noise Reduction Embodiments

Embodiments for performing noise reduction on digital images are described in this section. The example embodiments described herein are provided for illustrative purposes, and are not limiting. Although some embodiments are described below in terms of RGB and YUV color models, such embodiments may be adapted to any type of color model, including HSV, YIQ, Lab, and CIECAM. Furthermore, additional structural and operational embodiments, including modifications/alterations, will become apparent to persons skilled in the relevant art(s) from the teachings herein.

An image may be represented in terms of one or more luminance channels, and/or one or more chrominance channels. In embodiments, noise reduction may be performed on a channel of an image in a manner that takes into account edge information in one or more of the other chrominance and luminance channels of the image. For instance, in an embodiment, noise reduction may be performed on a chrominance channel of an image in a manner that takes into account edge information in one or more luminance channels of the image. In another embodiment, noise reduction may be performed on a luminance channel of an image in a manner that takes into account edge information in one or more chrominance channels of the image. In still another embodiment, noise reduction may be performed on a chrominance channel of an image in a manner that takes into account edge information in one or more other chrominance channels of the image.

Noise reduction may be performed on a channel of an image using any number of the channels of the image to guide the noise reduction process. For example, for illustrative purposes, embodiments are described below in terms of one luminance channel and two chrominance channels, for a total of three channels. In further embodiments, further channels may be present for an image that may also be used for noise reduction. For instance, some images may have 5, 10, 20, or even more channels (with varying spectral sensitivities) which may have edge information that is taken into account to reduce noise.

According to these embodiments, chrominance and luminance channels corresponding to a single captured image may be used to perform noise reduction for the image. Furthermore, in an embodiment where the chrominance and luminance channels of the image all relate to the visible light spectrum, it is more likely that relevant edge information will be present in channels of the image that will enable noise reduction to be performed on other channels of the image with less edge blur.

Figure 10:
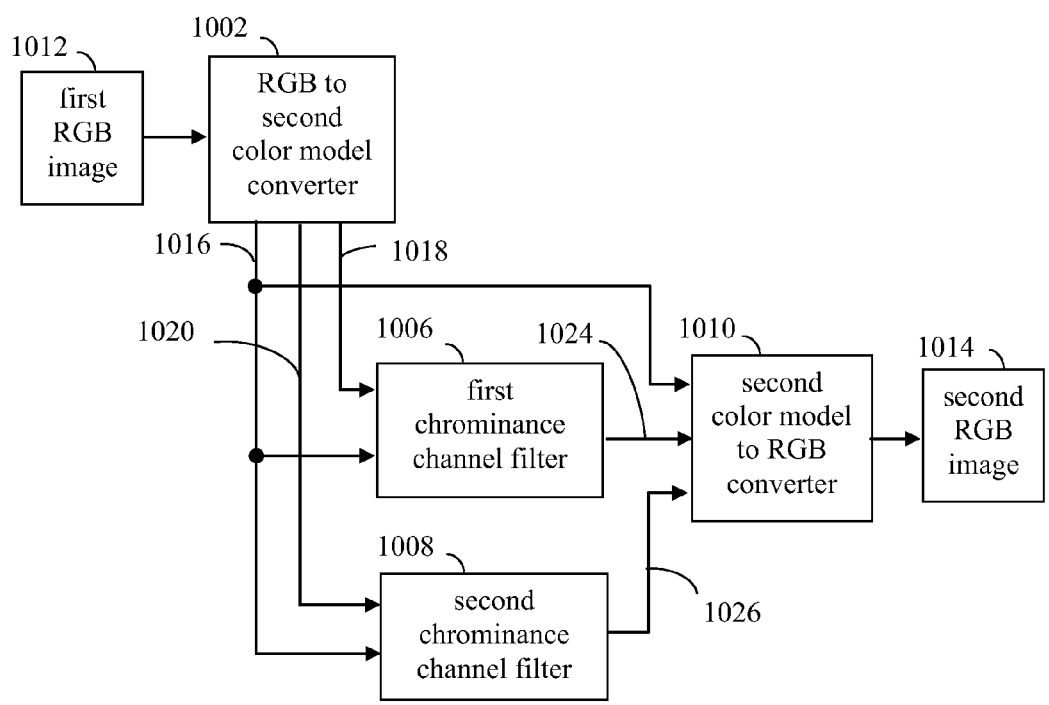
FIG. 10 shows a block diagram of a noise filter, according to an example embodiment.

FIG. 9 shows a flowchart 900 for noise filtering an image, according to an example embodiment. Flowchart 900 is described with respect to example noise filters shown in FIGS. 10, 13, and 16, which may be implemented as noise filter 108 in system 100 of FIG. 1. For instance, FIG. 10 shows a block diagram of a noise filter 1000, according to an example embodiment. As shown in FIG. 10, noise filter 1000 includes a RGB to second color model converter 1002, a first chrominance channel filter 1006, a second chrominance channel filter 1008, and a second color model to RGB converter 1010. The steps of flowchart 900 do not necessarily need to be performed in the order shown in FIG. 9. Other structural and operational embodiments will be apparent to persons skilled in the relevant art(s) based on the discussion regarding flowchart 900. Flowchart 900 is described as follows.

In step 902, a first image is converted from a first color model to a second color model that includes at least a luminance channel, a first chrominance channel, and a second chrominance channel that are representative of the first image. Step 902 is optional, depending on the color format of an image being processed according to flowchart 900. Images may be stored and transported in electronic form, such as one or more sets of data stored in the form of one or more files, in various color model formats. Images are frequency stored/transported in files in the RGB color space, because image capturing devices typically have red, green, and blue sensors, and because display devices typically have red, green, and blue display elements. Thus, in an embodiment, the first image (in step 902) may be converted from a chrominance-specific color model, such as the RGB color model, to a color model that defines an image in the luminance and chrominance color spaces.

For example, as shown in FIG. 10, RGB to second color model converter 1002 may optionally be present in filter 1000 to receive a first RGB image 1012. RGB to second color model converter 1002 is configured to convert first RGB image 1012 from the RGB color model to a second color model that includes at least a luminance channel, a first chrominance channel, and a second chrominance channel. For example, RGB to second color model converter 1002 may be configured to convert first RGB image 1012 to a YUV, HSV, YIQ, Lab, or CIECAM color model image. In an embodiment where RGB to second color model converter 1002 is configured to convert first RGB image 1012 to a YUV color model, mapping matrix 200 shown in FIG. 2, and described above, may be used to perform the conversion. Other types of color models, including HSV, YIQ, Lab, and CIECAM, have corresponding mapping algorithms for conversion from RGB that may be applied by converter 1002, as would be known to persons skilled in the relevant art(s).

As shown in FIG. 10, RGB to second color model converter 1002 generates a luminance channel 1016, a first chrominance channel 1018, and a second chrominance channel 1020 according to the second color model. Luminance channel 1016, first chrominance channel 1018, and second chrominance channel 1020 are each typically two-dimensional arrays of pixel values that are representative of their respective color model space. In an embodiment where the second color model is YUV, luminance channel 1016 is the Y channel, first chrominance channel 1018 is the U channel, and second chrominance channel 1020 is the V channel. In other embodiments, luminance channel 1016, first chrominance channel 1018, and second chrominance channel 1020, and one or more additional chrominance channels and/or luminance channels may be generated that correspond to further color models.

In step 904, the first chrominance channel is denoised in a manner that accounts at least for edge information in at least one of the luminance channel or the second chrominance channel. For instance, as shown in FIG. 10, first chrominance channel filter 1006 receives first chrominance channel 1018. First chrominance channel filter 1006 is configured to denoise first chrominance channel 1018. First chrominance channel filter 1006 may be configured to denoise first chrominance channel 1018 in a manner that takes into account edge information in any number of the other chrominance and/or luminance channels of the image. As shown in FIG. 10, first chrominance channel filter 1006 generates a denoised first chrominance channel 1024.

For example, in an embodiment, first chrominance channel filter 1006 may be configured to denoise first chrominance channel 1018 in a manner that accounts for edge information in luminance channel 1016. As shown in FIG. 10, first chrominance channel filter 1006 receives first chrominance channel 1018 and luminance channel 1016. First chrominance channel filter 1006 may be configured to perform a modified form of the joint bilateral filter described above to denoise first chrominance channel 1018 in a manner that accounts for edge information in luminance channel 1016. For example, first chrominance channel filter 1006 may denoise first chrominance channel 1018 by calculating a denoised pixel value for each pixel of first chrominance channel 1018 according to Equation 8, shown below:

$$J_s^{C1} = \frac{\sum_{p=\Omega} g(\|p-s\|, \sigma_h) g(I_p^L - I_s^L, \sigma_i^L) I_p^{C1}}{\sum_{p=\Omega} g(\|p-s\|, \sigma_h) g(I_p^L - I_s^L, \sigma_i^L)}, \quad \text{Equation 8}$$

where
$I^{C1}$ is first chrominance channel 1018,
Ω is a region of pixels of first chrominance channel 1018 that includes a pixel s,
p is a pixel located in the region of pixels Ω,
$I_p^{C1}$ is a pixel value in first chrominance channel 1018 for the pixel p,
$I_p^L$ is a pixel value in luminance channel 1016 for the pixel p,
$I_s^L$ is a pixel value in luminance channel 1016 for the pixel s,
$J^{C1}$ is the denoised first chrominance channel 1024,
$J_s^{C1}$ is the calculated denoised pixel value of the pixel s,
∥p-s∥ is an Euclidean distance between the pixel p and the pixel s,
$\sigma_h$ is a spatial falloff parameter,
$\sigma_i^L$ is an intensity falloff parameter for luminance channel 1016, and
g( ) is a Gaussian distribution.

In this embodiment, denoised first chrominance channel 1024 includes a denoised pixel value calculated according to Equation 8 for each pixel received in first chrominance channel 1018.

First chrominance channel filter 1006 may be adapted to perform Equation 8 according to a variety of color models, including the YUV, HSV, YIQ, Lab, and CIECAM color models. For example, Equation 8 is shown below as Equation 9, according to the YUV color space. In Equation 9, the joint bilateral filter is modified to denoise the U chrominance channel as first chrominance channel 1018 using the relatively less noisy luminance channel (Y) as luminance channel 1016:

$$J_s^U = \frac{\sum_{p=\Omega} g(\|p-s\|, \sigma_h) g(I_p^Y - I_s^Y, \sigma_i^Y) I_p^U}{\sum_{p=\Omega} g(\|p-s\|, \sigma_h) g(I_p^Y - I_s^Y, \sigma_i^Y)} \qquad \text{Equation 9}$$

where
$I^U$ is the U chrominance channel,
$I_p^U$ is a pixel value in the U chrominance channel for the pixel p,
$I_p^Y$ is a pixel value in the luminance (Y) channel for the pixel p,
$I_s^Y$ is a pixel value in the luminance (Y) channel for the pixel s,
$J^U$ is the denoised U chrominance channel,
$J_s^U$ is the calculated denoised pixel value of the pixel s, and
$\sigma_i^Y$ is an intensity falloff parameter for the luminance (Y) channel.

Figure 11:
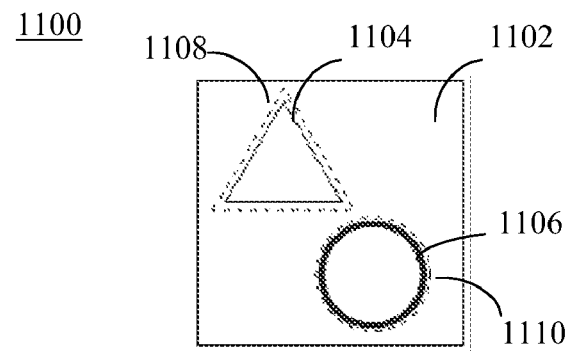
FIG. 11 shows the U chrominance channel of FIG. 5 denoised using a modified joint bilateral filter, according to an example embodiment.

FIG. 11 shows an example U chrominance channel 1100, which is a version of U chrominance channel 500 shown in FIG. 5 that is denoised according to Equation 9. In FIG. 11, U chrominance channel 1100 includes a triangle 1104, which corresponds to triangle 504 shown in FIG. 5, a circle 1106, which corresponds to circle 506 shown in FIG. 5, and a background 1102, which corresponds to background 502 shown in FIG. 5. Furthermore, U chrominance channel 1100 includes a first blurred region 1108 and a second blurred region 1110. First blurred region 1108 is located at an edge of triangle 1104, and second blurred region 1110 is located at an edge of circle 1106. First blurred region 1108 is due to blurring at the edge of triangle 1104 caused by the modified joint bilateral filter of Equation 9, and second blurred region 1110 is due to blurring at the edge of circle 1106 caused by the modified joint bilateral filter. Thus, Equation 9 can cause colors to become oversmoothed in regions having similar luminances but different color. Note, however, that the sizes of blurred region 1108 and 1110 are less than corresponding blurred regions 708 and 710 in FIG. 7, which were due to a Gaussian filter. The modified joint bilateral filter of Equations 8 and 9 generally provides improved filtering relative to the Gaussian filter and joint bilateral filter (Equation 6) described above.

In step 906, the second chrominance channel is denoised in a manner that accounts at least for edge information in at least one of the luminance channel or the first chrominance channel. For instance, as shown in FIG. 10, second chrominance channel filter 1008 receives second chrominance channel 1020. Second chrominance channel filter 1008 is configured to denoise second chrominance channel 1020. Second chrominance channel filter 1008 may be configured to denoise second chrominance channel 1020 in a manner that takes into account edge information in any number of the other chrominance and/or luminance channels of the image. As shown in FIG. 10, second chrominance channel filter 1008 generates a denoised second chrominance channel 1026.

For example, in an embodiment, second chrominance channel filter 1008 may be configured to denoise second chrominance channel 1020 in a manner that accounts for edge information in luminance channel 1016. As shown in FIG. 10, second chrominance channel filter 1008 receives second chrominance channel 1020 and luminance channel 1016. Second chrominance channel filter 1008 may be configured in a similar manner to first chrominance channel filter 1008 to perform a modified form of the joint bilateral filter, as shown as Equation 8, to denoise second chrominance channel 1020 in a manner that account for edge information in luminance channel 1016. For example, in an embodiment, second chrominance channel filter 1008 may be configured to denoise second chrominance channel 1020 by calculating a denoised pixel value for each pixel of second chrominance channel 1020 according to Equation 10, shown below:

$$J_s^{C2} = \frac{\sum_{p=\Omega} g(\|p-s\|, \sigma_h) g(I_p^L - I_s^L, \sigma_i^L) I_p^{C2}}{\sum_{p=\Omega} g(\|p-s\|, \sigma_h) g(I_p^L - I_s^L, \sigma_i^L)} \qquad \text{Equation 10}$$

where
$I^{C2}$ is second chrominance channel 1020,
Ω is a region of pixels of second chrominance channel 1020 that includes a pixel s,
p is a pixel located in the region of pixels Ω,
$I_p^{C2}$ is a pixel value in second chrominance channel 1020 for the pixel p,
$J^{C2}$ is the denoised second chrominance channel 1026, and
$J_s^{C2}$ is the calculated denoised pixel value of the pixel s.

Furthermore, second chrominance channel filter 1008 may be adapted to perform Equation 10 according to a variety of color models, including the YUV, HSV, YIQ, Lab, and CIECAM color models. For example, second chrominance channel filter 1008 may be adapted to denoise a V chrominance channel as second chrominance channel 1020 (e.g., in a similar manner as described above with respect to Equation 9 for first chrominance channel filter 1006 with regard to a U chrominance channel). For example, Equation 9 can be rewritten by replacing each occurrence of "U" with "V" to correspond to denoising of a V chrominance channel.

In step 908, the luminance channel, the denoised first chrominance channel, and the denoised second chrominance channel are converted to a second image formatted according to the second color model. Step 908 is optional, depending on the color format of an image being processed according to flowchart 900. For example, as shown in FIG. 10, second color model to RGB converter 1010 may optionally be present in noise filter 1000 to enable noise filter 1000 to generate an RGB image, if desired. As shown in FIG. 10, second color model to RGB converter 1010 receives luminance channel 1016, denoised first chrominance channel 1024, and denoised second chrominance channel 1026, which represent an image formatted according to the second color model (e.g., Y, UV, etc.). Second color model to RGB converter 1010 is configured to convert channels 1016, 1024, and 1026 to an image formatted according to a chrominance-specific color model (e.g., the color model of first RGB image 1012). Second color model to RGB converter 1010 may be configured to convert images according to various color models, including the YUV, HSV, YIQ, Lab, or CIECAM color models, to an RGB color model image. Mapping algorithms that may be performed by converter 1010 for converting an image formatting in various color models to the RGB color model are well known to persons skilled in the relevant art(s). As shown in FIG. 10, second color model to RGB converter 1010 generates second RGB image 1014, which is formatted according to the RGB color model.

Figure 12:
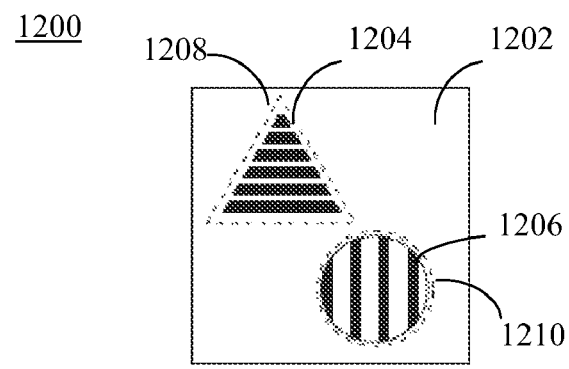
FIG. 12 shows an RGB color model image generated from the image of FIG. 3, where the image of FIG. 3 was converted to the YUV color space, was denoised using a modified joint bilateral filter in the YUV color space, and was converted to the RGB color space.

FIG. 12 shows an image 1200 that is a version of image 300 (FIG. 3) that is denoised using noise filter 1000, according to an example embodiment. As shown in FIG. 12, image 1200 includes a triangle 1204, which corresponds to triangle 304 shown in FIG. 3, a circle 1206, which corresponds to circle 306 shown in FIG. 3, and a background 1202, which corresponds to background 302 shown in FIG. 3. Image 1200 is a combination of luminance channel 400 (e.g., luminance channel 1016 in FIG. 10), U chrominance channel 1100 shown in FIG. 11 (e.g., denoised first chrominance channel 1024 in FIG. 10), and a denoised V chrominance channel (e.g., denoised second chrominance channel 1026 in FIG. 10). Due to the blurring in U chrominance channel 1100 shown in FIG. 1, and further blurring that may have occurred while denoising the V chrominance channel, image 1200 includes a first blurred region 1208 located at an edge of triangle 1204, and a second blurred region 1210 located at an edge of circle 1206. Note, however, that the sizes of blurred region 1208 and 1210 are less than corresponding blurred regions 808 and 810 in FIG. 8 for image 800, which was filtered by a Gaussian filter. The modified joint bilateral filter of noise filter 1000 generally provides improved filtering relative to the Gaussian filter and joint bilateral filter (Equation 6) described above.

Figure 13:
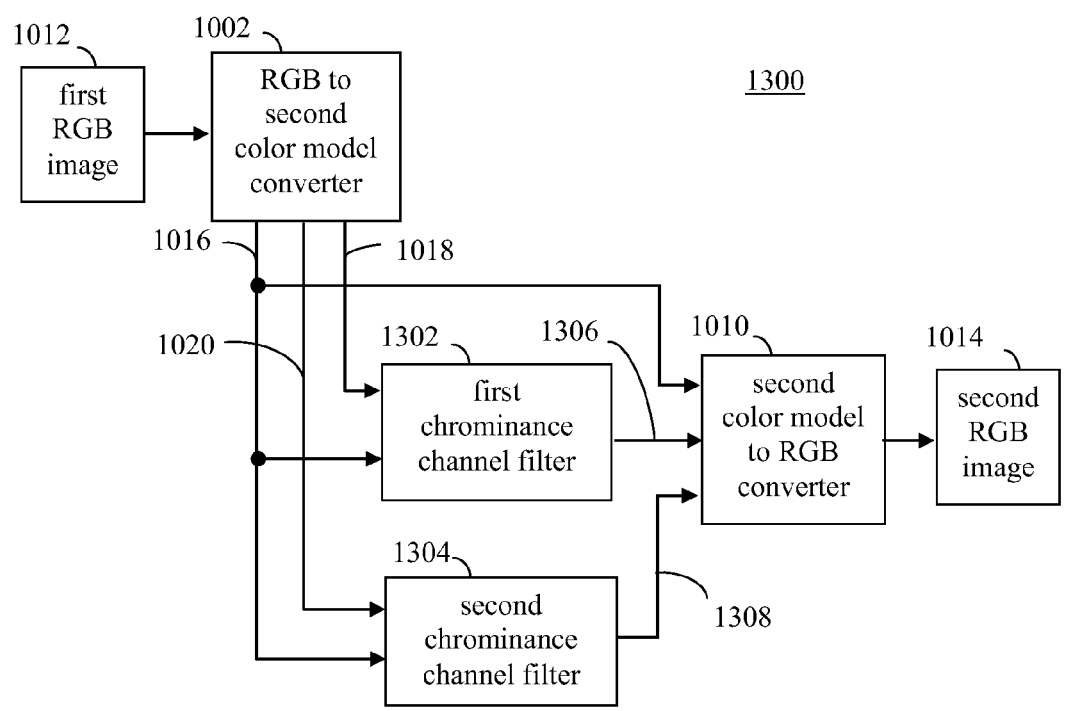
FIG. 13 shows a block diagram of a noise filter, according to an example embodiment.

Note that in further embodiments, steps 904 and 906 may use alternative denoising techniques to the modified joint bilateral filter described above. For example, FIG. 13 shows a block diagram of a noise filter 1300, according to an embodiment of the present invention. As shown in FIG. 13, noise filter 1300 includes RGB to second color model converter 1002, a first chrominance channel filter 1302, a second chrominance channel filter 1304, and second color model to RGB converter 1010. Noise filter 1300 is generally similar to noise filter 1000 of FIG. 10, with differences described as follows.

Comparing noise filters 1000 and 1300, first chrominance channel filter 1302 replaces first chrominance channel filter 1006, and second chrominance channel filter 1304 replaces second chrominance channel filter 1008. Referring to FIG. 13, first chrominance channel filter 1302 receives first chrominance channel 1018 and luminance channel 1016, and generates a denoised first chrominance channel 1306. First chrominance channel filter 1302 is configured to denoise first chrominance channel 1018. First chrominance channel filter 1302 may be configured to denoise first chrominance channel 1018 in a manner that accounts for edge information in luminance channel 1016 and in first chrominance channel 1018. For example, first chrominance channel filter 1302 may be configured to perform a modified form of the dual bilateral filter to denoise first chrominance channel 1018 in a manner that account for edge information in luminance channel 1016 and first chrominance channel 1018.

For example, in an embodiment, first chrominance channel filter 1302 may denoise first chrominance channel 1018 by calculating a denoised pixel value for each pixel of first chrominance channel 1018 according to Equation 11, shown below. Equation 11 is an example expression of the modified form of the dual bilateral filter:

$$J_s^{C1} = \frac{\sum_{p=\Omega} g(\|p-s\|, \sigma_h) g(I_p^L - I_s^L, \sigma_i^L) g(I_p^{C1} - I_s^{C1}, \sigma_i^{C1}) I_p^{C1}}{\sum_{p=\Omega} g(\|p-s\|, \sigma_h) g(I_p^L - I_s^L, \sigma_i^L) g(I_p^{C1} - I_s^{C1}, \sigma_i^{C1})} \qquad \text{Equation 11}$$

where $I^{C1}$ is first chrominance channel 1018, $\Omega$ is a region of pixels of first chrominance channel 1018 that includes a pixel s, p is a pixel located in the region of pixels $\Omega$, $I_p^{C1}$ is a pixel value in first chrominance channel 1018 for the pixel p, $I_s^{C1}$ is a pixel value in first chrominance channel 1018 for the pixel s, $I_p^L$ is a pixel value in luminance channel 1016 for the pixel p, $I_s^L$ is a pixel value in luminance channel 1016 for the pixel s, $J^{C1}$ is the denoised first chrominance channel 1024, $J_s^{C1}$ is the calculated denoised pixel value of the pixel s, $\|p-s\|$ is an Euclidean distance between the pixel p and the pixel s, $\sigma_h$ is a spatial falloff parameter, $\sigma_i^{C1}$ is an intensity falloff parameter for first chrominance channel 1018, $\sigma_i^L$ is an intensity falloff parameter for luminance channel 1016, and g( ) is a Gaussian distribution.

In this embodiment, denoised first chrominance channel 1024 includes a denoised pixel value calculated according to Equation 11 for each pixel received in first chrominance channel 1018.

First chrominance channel filter 1302 may be adapted to perform Equation 11 according to a variety of color models, including the YUV, HSV, YIQ, Lab, and CIECAM color models. For example, Equation 11 is shown below as Equation 12, modified according to the YUV color space. In Equation 12, the dual bilateral filter is modified to denoise the U chrominance channel as first chrominance channel 1018 using the relatively less noisy luminance channel (Y) as luminance channel 1016:

$$J_s^U = \frac{\sum_{p=\Omega} g(\|p-s\|, \sigma_h)}{\sum_{p=\Omega} g(\|p-s\|, \sigma_h) g(I_p^Y - I_s^Y, \sigma_i^Y) g(I_p^U - I_s^U, \sigma_i^U)} \quad \text{Equation 12}$$

where
   $I^U$ is the U chrominance channel,
   $I_p^U$ is a pixel value in the U chrominance channel for the pixel p,
   $I_p^Y$ is a pixel value in the luminance (Y) channel for the pixel p,
   $I_s^U$ is a pixel value in the U chrominance channel for the pixel s,
   $I_s^Y$ is a pixel value in the luminance (Y) channel for the pixel s,
   $J^U$ is the denoised U chrominance channel,
   $J_s^U$ is the calculated denoised pixel value of the pixel s,
   $\sigma_i^U$ is an intensity falloff parameter for the U chrominance channel, and
   $\sigma_i^Y$ is an intensity falloff parameter for the luminance (Y) channel.

Figure 14:
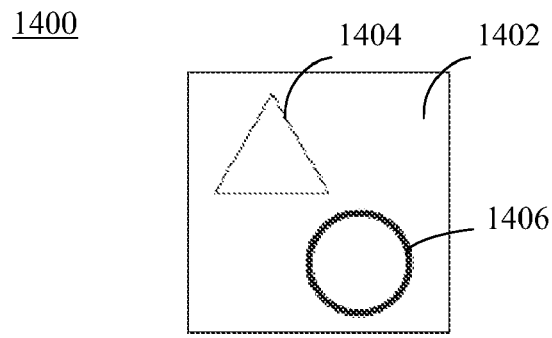
FIG. 14 shows the U chrominance channel of FIG. 5 denoised by a chrominance channel filter, according to example embodiments of the present invention.

FIG. 14 shows an example U chrominance channel 1400 that is an example of U chrominance channel 500 as denoised by first chrominance channel filter 1302. In FIG. 14, U chrominance channel 1400 includes a triangle 1404, which corresponds to triangle 504 shown in FIG. 5, a circle 1406, which corresponds to circle 506 shown in FIG. 5, and a background 1402, which corresponds to background 502 shown in FIG. 5. Furthermore, note that blurred regions for U chrominance channel 1400 are not visible in FIG. 14 due to their relatively small scale relative to FIGS. 7 and 11 for less effective denoising techniques. The modified dual bilateral filter of Equations 11 and 12 generally provides improved filtering relative to the Gaussian filter, joint bilateral filter (Equation 6), and dual bilateral filter (Equation 7) described above.

As shown in FIG. 13, second chrominance channel filter 1304 receives second chrominance channel 1020. Second chrominance channel filter 1304 is configured to denoise second chrominance channel 1020. Second chrominance channel filter 1304 may be configured to denoise second chrominance channel 1020 in a manner that accounts for edge information in luminance channel 1016 and second chrominance channel 1020 in a similar manner as described above for first chrominance channel filter 1304. For example, second chrominance channel filter 1304 may be configured in a similar manner to first chrominance channel filter 1302 to perform a modified form of the dual bilateral filter shown as Equations 11 and/or 12 to denoise second chrominance channel 1020. For example, second chrominance channel filter 1304 may be adapted to denoise a V chrominance channel in a YUV color channel embodiment. For instance, Equation 12 can be rewritten by replacing each occurrence of "U" with "V" to correspond to denoising of a V chrominance channel.

Figure 15:
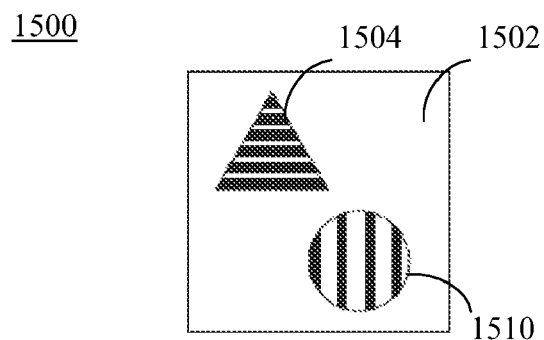
FIG. 15 shows an RGB color model image generated from the image of FIG. 3, where the image of FIG. 3 was converted to the YUV color space, was denoised using a noise filter in the YUV color space, and was converted to the RGB color space.

As shown in FIG. 13, second color model to RGB converter 1010 receives luminance channel 1016, denoised first chrominance channel 1306, and denoised second chrominance channel 1308, and generates second RGB image 1014 (e.g., according to step 908 of flowchart 900 in FIG. 9). FIG. 15 shows an image 1500 that is denoised version of image 300 (FIG. 3) using noise filter 1300, and is an example of second RGB image 1014, according to an example embodiment. As shown in FIG. 15, image 1500 includes a triangle 1504, which corresponds to triangle 304 shown in FIG. 3, a circle 1506, which corresponds to circle 306 shown in FIG. 3, and a background 1502, which corresponds to background 302 shown in FIG. 3. Image 1500 is a combination of luminance channel 400 (e.g., luminance channel 1016 in FIG. 13), U chrominance channel 1400 shown in FIG. 14 (e.g., denoised first chrominance channel 1306 in FIG. 13), and a denoised V chrominance channel (e.g., denoised second chrominance channel 1308 in FIG. 13). Furthermore, note that blurred regions for image 1500 are not visible in FIG. 15 due to their relatively small scale relative to those shown in FIGS. 8 and 12 for less effective noise filters.

Figure 16:
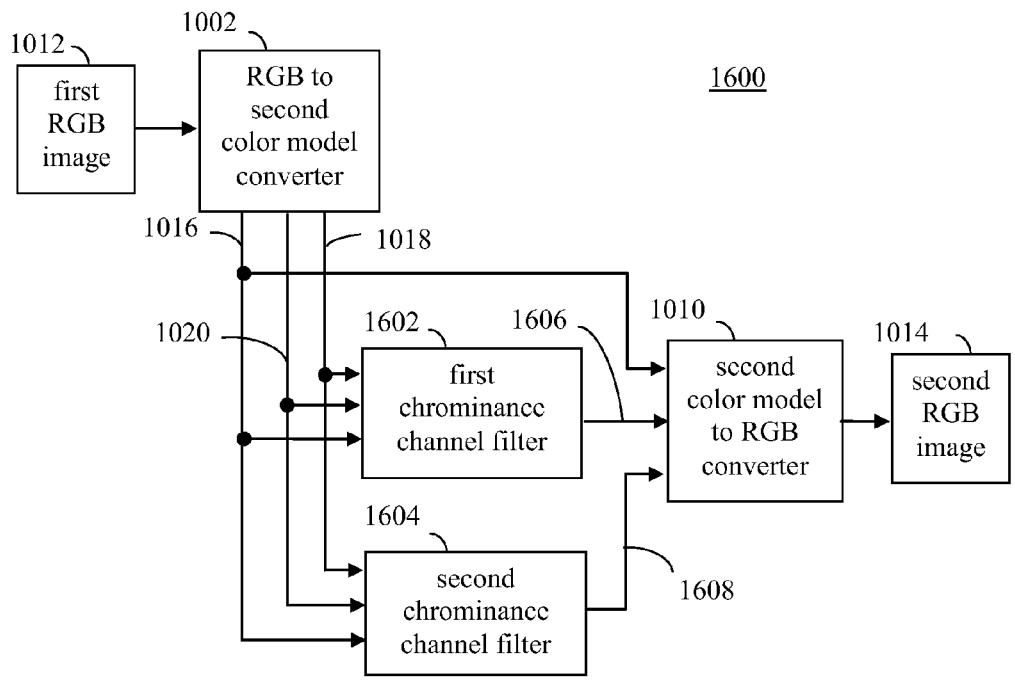
FIGS. 16 and 17 show block diagrams of noise filters, according to example embodiments.

FIG. 16 shows a block diagram of a noise filter 1600, according to another embodiment of the present invention. As shown in FIG. 16, noise filter 1600 includes RGB to second color model converter 1002, a first chrominance channel filter 1602, a second chrominance channel filter 1604, and second color model to RGB converter 1010. Noise filter 1600 is generally similar to noise filter 1000, with differences described as follows.

Comparing noise filters 1600 and 1000, first chrominance channel filter 1602 replaces first chrominance channel filter 1006, and second chrominance channel filter 1604 replaces second chrominance channel filter 1008. Referring to FIG. 16, first chrominance channel filter 1602 is configured to denoise first chrominance channel 1018. As shown in FIG. 16, first chrominance channel filter 1602 receives first chrominance channel 1018, second chrominance channel 1020, and luminance channel 1016, and generates a denoised first chrominance channel 1606. First chrominance channel filter 1602 may be configured to denoise first chrominance channel 1018 in a manner that accounts for edge information in luminance channel 1016, first chrominance channel 1018, and second chrominance channel 1020. For instance, first chrominance channel filter 1602 may be configured to perform a modified form of the bilateral filter, referred to herein as the trilateral filter, to denoise first chrominance channel 1018 in a manner that account for edge information in luminance channel 1016, first chrominance channel 1018, and second chrominance channel 1020. The trilateral filter is an even further improved noise reduction technique. For example, the trilateral filter is particularly effective with noise reduction in image areas having skin tones, which is of great importance in many types of photography. By using more channels, including using all available channels (e.g., using all three available channels for YUV), the trilateral filter is also the most robust technique with respect to reducing noise.

For example, in an embodiment, first chrominance channel filter 1602 may denoise first chrominance channel 1018 by calculating a denoised pixel value for each pixel of first chrominance channel 1018 according to Equation 13, shown below. Equation 13 is an example expression of the trilateral filter:

$$J_s^{C1} = \frac{\sum_{p=\Omega} g(\|p-s\|, \sigma_h) g(I_p^L - I_s^L, \sigma_i^L)}{\sum_{p=\Omega} g(\|p-s\|, \sigma_h) g(I_p^L - I_s^L, \sigma_i^L)} \cdot \frac{g(I_p^{C1} - I_s^{C1}, \sigma_i^{C1}) g(I_p^{C2} - I_s^{C2}, \sigma_i^{C2}) I_p^{C1}}{g(I_p^{C1} - I_s^{C1}, \sigma_i^{C1}) g(I_p^{C2} - I_s^{C2}, \sigma_i^{C2})} \quad \text{Equation 13}$$

where
   $I^{C1}$ is first chrominance channel 1018,
   $\Omega$ is a region of pixels of first chrominance channel 1018 that includes a pixel s,
   p is a pixel located in the region of pixels $\Omega$, $I_p^{C1}$ is a pixel value in first chrominance channel 1018 for the pixel p, $I_s^{C1}$ is a pixel value in first chrominance channel 1018 for the pixel s, $I_p^{C2}$ is a pixel value in second chrominance channel 1020 for the pixel p, $I_s^{C2}$ is a pixel value in second chrominance channel 1020 for the pixel s, $I_p^L$ is a pixel value in luminance channel 1016 for the pixel p, $I_s^L$ is a pixel value in luminance channel 1016 for the pixel s, $J^{C1}$ is the denoised first chrominance channel 1024, $J_s^{C1}$ is the calculated denoised pixel value of the pixel s, $\|p\text{-}s\|$ is an Euclidean distance between the pixel p and the pixel s, $\sigma_h$ is a spatial falloff parameter, $\sigma_i^{C1}$ is an intensity falloff parameter for first chrominance channel 1018, $\sigma_i^{C2}$ is an intensity falloff parameter for second chrominance channel 1020, $\sigma_i^L$ is an intensity falloff parameter for luminance channel 1016, and g( ) is a Gaussian distribution.

In this embodiment, denoised first chrominance channel 1024 includes a denoised pixel value calculated according to Equation 13 for each pixel received in first chrominance channel 1018.

First chrominance channel filter 1602 may be adapted to perform Equation 13 for a variety of color models, including the YUV, HSV, YIQ, Lab, and CIECAM color models. For example, Equation 13 is shown below as Equation 14, modified for the YUV color space:

$$J_s^U = \frac{\sum_{p=\Omega} g(\|p-s\|, \sigma_h)g(I_p^Y - I_s^Y, \sigma_i^Y) g(I_p^U - I_s^U, \sigma_i^U)g(I_p^V - I_s^V, \sigma_i^V)I_p^U}{\sum_{p=\Omega} g(\|p-s\|, \sigma_h)g(I_p^Y - I_s^Y, \sigma_i^Y) g(I_p^U - I_s^U, \sigma_i^U)g(I_p^V - I_s^V, \sigma_i^V)}$$

Equation 14 where $I^U$ is the U chrominance channel, $I_p^U$ is a pixel value in the U chrominance channel for the pixel p, $I_p^V$ is a pixel value in the V chrominance channel for the pixel p, $I_p^Y$ is a pixel value in the luminance (Y) channel for the pixel p, $I_s^U$ is a pixel value in the U chrominance channel for the pixel s, $I_s^V$ is a pixel value in the V chrominance channel for the pixel s, $I_s^Y$ is a pixel value in the luminance (Y) channel for the pixel s, $J^U$ is the denoised U chrominance channel, $J_s^U$ is the calculated denoised pixel value of the pixel s, $\sigma_i^U$ is an intensity falloff parameter for the U chrominance channel, $\sigma_i^V$ is an intensity falloff parameter for the V chrominance channel, and $\sigma_i^Y$ is an intensity falloff parameter for the luminance (Y) channel.

As indicated above, FIG. 14 shows U chrominance channel 1400, which is described as the result of U chrominance channel 500 (FIG. 5) being denoised by the modified dual bilateral filter (e.g., Equation 12). U chrominance channel 1400 may also be representative of U chrominance channel 500 being denoised by first chrominance channel filter 1602 according to the trilateral filter of Equation 14. Again, with regard to denoising by first chrominance channel filter 1602, blurred regions for U chrominance channel 1400 are not visible in FIG. 14 due to their relatively small scale (relative to less effective denoising techniques). In general, denoising according to the trilateral filter of first chrominance channel filter 1602 will result in less blurring than denoising according to the modified dual bilateral filter (e.g., first chrominance channel filter 1302 shown in FIG. 13).

As shown in FIG. 16, second chrominance channel filter 1604 receives second chrominance channel 1020. Second chrominance channel filter 1604 is configured to denoise second chrominance channel 1020. Similarly to first chrominance channel filter 1604, second chrominance channel filter 1604 may be configured to denoise second chrominance channel 1020 in a manner that takes into account edge information in luminance channel 1016, first chrominance channel 1018, and second chrominance channel 1020. For example, second chrominance channel filter 1604 may be configured (in a similar manner to first chrominance channel filter 1602) to perform the trilateral filter shown as Equations 13 and/or 14 to denoise second chrominance channel 1020. For example, Equation 13 may be modified by replacing "$I_p^{C1}$" with "$I_p^{C2}$" and "$J_s^{C1}$" with "$J_s^{C2}$". Equation 14 may be modified by replacing "$I_p^U$" with "$I_p^V$" and "$J_s^U$" with "$J_s^V$".

As shown in FIG. 16, second color model to RGB converter 1010 receives luminance channel 1016, denoised first chrominance channel 1606, and denoised second chrominance channel 1608, and generates second RGB image 1014 (e.g., according to step 908 of flowchart 900 in FIG. 9). As indicated above, FIG. 15 shows image 1500, which is described as the result of denoising image 300 by the modified dual bilateral filter embodiment of noise filter 1300 (FIG. 13). Image 1500 may also be representative of image 300 being denoised using the trialateral filter embodiment of noise filter 1600. In general, denoising according to the trilateral filter configuration of noise filter 1600 will result in less blurring than denoising according to the modified dual bilateral filter (e.g., noise filter 1300 of FIG. 13).

Note that in the noise filter embodiments described above (e.g., noise filters 1000, 1300, 1600), second color model to RGB converter 1010 receives an un-processed (e.g., un-filtered) version of the luminance channel—luminance channel 1016—that is used to form second RGB image 1014. Alternatively, a processed version of luminance channel 1016 may be used to form second RGB image 1014.

Figure 17:
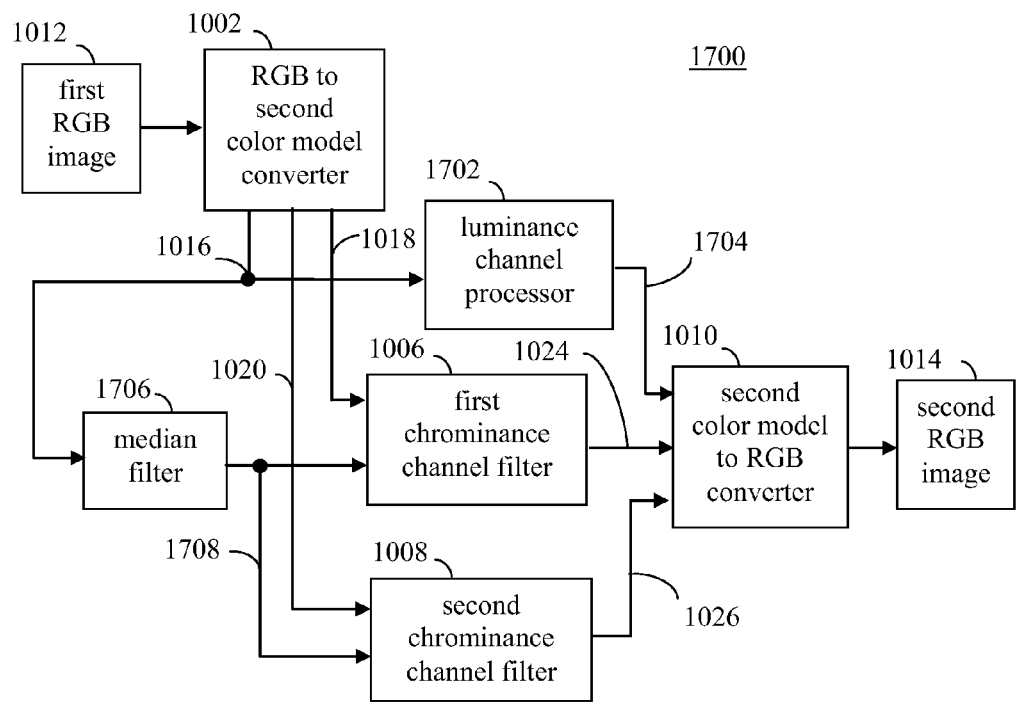

For example, in an embodiment, luminance channel 1016 may be filtered. FIG. 17 shows a noise filter 1700, according to another example embodiment. As shown in FIG. 17, noise filter 1700 is similar to noise filter 1000 shown in FIG. 10, with the addition of a luminance channel processor 1702 and a median filter 1706. Luminance channel processor 1702 and median filter 1706 are described as follows.

When present, median filter 1706 receives luminance channel 1016. Median filter 1706 is configured to perform a median filtering function on luminance channel 1016. For example, median filter 1706 may be used to reduce an occurrence of false positive edges in luminance channel 1016. In an embodiment, median filter 1706 filters each pixel value in luminance channel 1016. For example, for each pixel, median filter 1706 may generate a pixel value for a region of pixels in luminance channel 1016 that includes the pixel (which is typically the center pixel of the region), and assigns the pixel the median pixel value as the filtered pixel value. Median filter 1706 may be configured to determine a statistical median pixel value for the pixels within any size region, including a 3×3 pixel region, a 5×5 pixel region, or a larger pixel region.

As shown in FIG. 17, median filter 1706 generates a filtered luminance channel 1708. Filtered luminance channel 1708 is received by first and second chrominance channel filters 1006 and 1008. Thus, in the embodiment of FIG. 17, first and second chrominance channel filters 1006 and 1008 perform denoising of first and second chrominance channels 1018 and 1020, respectively, based on the filtered version of luminance channel 1016—filtered luminance channel 1708. Noise reduction may be improved in this manner, because filtered luminance channel 1708 may have fewer false positive edges to be mistaken as edges by first and second chrominance channel filters 1006 and 1008, as compared to luminance channel 1016.

Furthermore, in an embodiment, second color model to RGB converter 1010 may receive a processed version of luminance channel 1016. For example, as shown in FIG. 17, luminance channel processor 1702 receives luminance channel 1016, processes luminance channel 1016, and generates a processed luminance channel 1704. Second color model to RGB converter 1010 receives processed luminance channel 1704. Second color model to RGB converter 1010 generates second RGB image 1014 based on processed luminance channel 1704, denoised first chrominance channel 1024, and denoised second chrominance channel 1026.

Luminance channel processor 1702 may be configured to perform any type of processing of luminance channel 1016. For example, luminance channel processor 1702 may implement scaling, a Gaussian filter, a median filter, a bilateral filter, a joint bilateral filter, a dual bilateral filter, a modified joint bilateral filter (e.g., Equation 8), a modified joint bilateral filter (e.g., Equation 11), and/or a trilateral filter (e.g. Equation 13) on luminance channel 1016 to generate processed luminance channel 1704.

Note that in embodiments, luminance channel processor 1702 and/or median filter 1706 may be included in noise filter 1300 of FIG. 13, noise filter 1600 of FIG. 16, and/or any other embodiments described herein.

Furthermore, each the parameter values $\sigma_i^L$, $\sigma_i^{C1}$, and $\sigma_i^{C2}$ (e.g., $\sigma_i^Y$, $\sigma_i^U$, and $\sigma_i^V$, in a YUV embodiment) described above, when present, and/or further a parameter values (based on the particular noise filter implementation) may be selected based on the relative noise intensities of each of the corresponding channels, as would be apparent to persons skilled in the relevant art(s). For instance, in an example YUV embodiment, the values of $\sigma_i^U$ and $\sigma_i^V$ may be selected in a range between 0.5 and 3 times larger than $\sigma_i^Y$. Such values may be determined in various ways, including being based on the characteristics of the image sensor (e.g., image capturing device 102 of FIG. 1) and its settings.

Note that noise filters 1000, 1300, 1600, and 1700 may be implemented in hardware, software, firmware, or any combination thereof. For example, any one or more of RGB to second color model converter 1002, median filter 1706, first chrominance channel filters 1006, 1302, and 1602, second chrominance channel filters 1008, 1304, and 1604, second color model to RGB converter 1010, and/or luminance channel processor 1702 may be implemented as computer code configured to be executed in one or more processors. Alternatively, any one or more of RGB to second color model converter 1002, median filter 1706, first chrominance channel filters 1006, 1302, and 1602, second chrominance channel filters 1008, 1304, and 1604, second color model to RGB converter 1010, and/or luminance channel processor 1702 may be implemented as hardware logic/electrical circuitry.

In an embodiment, noise filters and noise reduction embodiments described herein may be implemented in a computer, such as personal computer, a mobile computer (e.g., a laptop computer, a notebook computer, a handheld computer such as a personal digital assistant (PDA) or a Palm™ device, etc.), or a workstation. Alternatively, such embodiments may be implemented in devices that incorporate an image sensor, such as a cell phone, a digital camera, a camcorder, etc. These example devices are provided herein purposes of illustration, and are not intended to be limiting. Embodiments of the present invention may be implemented in further types of devices, as would be known to persons skilled in the relevant art(s).

Devices in which embodiments may be implemented may include storage, such as storage drives, memory devices, and further types of computer-readable media. Examples of such computer-readable media include a hard disk, a removable magnetic disk, a removable optical disk, flash memory cards, digital video disks, random access memories (RAMs), read only memories (ROM), and the like. As used herein, the terms "computer program medium" and "computer-readable medium" are used to generally refer to the hard disk associated with a hard disk drive, a removable magnetic disk, a removable optical disk (e.g., CDROMs, DVDs, etc.), zip disks, tapes, magnetic storage devices, MEMS (micro-electromechanical systems) storage, nanotechnology-based storage devices, as well as other media such as flash memory cards, digital video discs, RAM devices, ROM devices, and the like. Such computer-readable media may store program modules that include logic for implementing noise filters 1000, 1300, 1600, and 1700, flowchart 900, and/or further embodiments of the present invention described herein. Embodiments of the invention are directed to computer program products comprising such logic (e.g., in the form of software) stored on any computer useable medium. Such software, when executed in one or more data processing devices, causes a device to operate as described herein.

CONCLUSION

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. Accordingly, the breadth and scope of the present invention should not be limited by any of the above-described exemplary embodiments, but should be defined only in accordance with the following claims and their equivalents

What is claimed is:
1. A method for reducing noise in an image, comprising:
  receiving a first image as a first set of data formatted according to a red-green-blue (RGB) color model;
  converting the first set of data from the RGB color model to a second color model that includes at least a luminance channel, a first chrominance channel, and a second chrominance channel that are representative of the first image;
  denoising the first chrominance channel using modified joint bilateral filtering in a manner that accounts at least for edge information in the luminance channel by calculating a denoised chrominance value for each pixel of the first chrominance channel according to $$J_s^{C1} = \frac{\sum_{p=\Omega} g(\|p-s\|, \sigma_h) g(I_p^L - I_s^L, \sigma_i^L) I_p^{C1}}{\sum_{p=\Omega} g(\|p-s\|, \sigma_h) g(I_p^L - I_s^L, \sigma_i^L)},$$

where
$I^{C1}$ is the first chrominance channel,
$\Omega$ is a region of pixels of the first chrominance channel that includes a pixel s,
p is a pixel located in the region of pixels $\Omega$,
$I_p^{C1}$ is a chrominance value in the first chrominance channel for the pixel p,
$I_p^L$ is a luminance value in the luminance channel for the pixel p,
$I_s^L$ is a luminance value in the luminance channel for the pixel s,
$J^{C1}$ is the denoised first chrominance channel image,
$J_s^{C1}$ is the calculated denoised chrominance value of the pixel s,
$\|p\text{-}s\|$ is an Euclidean distance between the pixel p and the pixel s,
$\sigma_h$ is a spatial falloff parameter,
$\sigma_i^L$ is an intensity falloff parameter for the luminance channel, and
g( ) is a Gaussian distribution;
denoising the second chrominance channel in a manner that accounts at least for edge information in the luminance channel; and
converting the luminance channel, the denoised first chrominance channel, and the denoised second chrominance channel to a second set of data formatted according to the RGB color model that is representative of a second image.

2. The method of claim 1, further comprising:
processing the luminance channel; and
wherein said converting the luminance channel, the denoised first chrominance channel, and the denoised second chrominance channel to a second set of data formatted according to the RGB color model that is representative of a second image comprises
converting the processed luminance channel, the denoised first chrominance channel, and the denoised second chrominance channel to the second set of data formatted according to the RGB color model.

3. The method of claim 1, further comprising:
median filtering the luminance channel; and
wherein said denoising the first chrominance channel using modified joint bilateral filtering in a manner that accounts at least for edge information in the luminance channel comprises:
denoising the first chrominance channel modified joint bilateral filtering in a manner that accounts for edge information in the filtered luminance channel; and
said denoising the second chrominance channel in a manner that accounts at least for edge information in the luminance channel comprises:
denoising the second chrominance channel in a manner that accounts for edge information in the filtered luminance channel.

4. The method of claim 1, further comprising:
median filtering the luminance channel; and
wherein said denoising the first chrominance channel using modified joint bilateral filtering in a manner that accounts at least for edge information in the luminance channel comprises:
denoising the first chrominance channel modified joint bilateral filtering in a manner that accounts for edge information in the filtered luminance channel; and
said denoising the second chrominance channel in a manner that accounts at least for edge information in the luminance channel comprises:
denoising the second chrominance channel in a manner that accounts for edge information in the filtered luminance channel.

5. A method for reducing noise in an image, comprising:
converting a first image formatted according to a first color model from a chrominance-specific color model to a second color model that includes at least a luminance channel, a first chrominance channel, and a second chrominance channel that are representative of the first image;
denoising the first chrominance channel using modified dual bilateral filtering in a manner that accounts for edge information in the luminance channel and edge information in either the first chrominance channel or the second chrominance channel by calculating a denoised chrominance value for each pixel of the first chrominance channel according to $$J_s^{C1} = \frac{\sum_{p=\Omega} g(\|p-s\|, \sigma_h) g(I_p^L - I_s^L, \sigma_i^L) g(I_p^{C1} - I_s^{C1}, \sigma_i^{C1}) I_p^{C1}}{\sum_{p=\Omega} g(\|p-s\|, \sigma_h) g(I_p^L - I_s^L, \sigma_i^L) g(I_p^{C1} - I_s^{C1}, \sigma_i^{C1})},$$

where
$I^{C1}$ is the first chrominance channel,
$\Omega$ is a region of pixels of the first chrominance channel that includes a pixel s,
p is a pixel located in the region of pixels $\Omega$,
$I_p^{C1}$ is a chrominance value in the first chrominance channel for the pixel p,
$I_p^L$ is a luminance value in the luminance channel for the pixel p,
$I_s^L$ is a luminance value in the luminance channel for the pixel s,
$I_p^{C1}$ is a chrominance value in the first chrominance channel for the pixel p,
$I_s^{C1}$ is a chrominance value in the first chrominance channel for the pixel s,
$J^{C1}$ is the denoised first chrominance channel image,
$J_s^{C1}$ is the calculated denoised chrominance value of the pixel s,
$\|p\text{-}s\|$ is an Euclidean distance between the pixel p and the pixel s,
$\sigma_h$ is a spatial falloff parameter,
$\sigma_i^L$ is an intensity falloff parameter for the luminance channel,
$\sigma_i^{C1}$ is an intensity falloff parameter for the first chrominance channel, and
g( ) is a Gaussian distribution;
denoising the second chrominance channel in a manner that accounts for edge information in the luminance channel and edge information in either the first chrominance channel or the second chrominance channel; and converting the luminance channel, the denoised first chrominance channel, and the denoised second chrominance channel to a second image formatted according to the first color model.

6. The method of claim 5, further comprising:
processing the luminance channel; and
wherein said converting the luminance channel, the denoised first chrominance channel, and the denoised second chrominance channel to a second set of data formatted according to the first color model that is representative of a second image comprises
converting the processed luminance channel, the denoised first chrominance channel, and the denoised second chrominance channel to the second set of data formatted according to the first color model.

7. A method for reducing noise in an image, comprising:
receiving a first image as a first set of data formatted according to a red-green-blue (RGB) color model;
converting the first set of data from the RGB color model to a second color model that includes at least a luminance channel, a first chrominance channel, and a second chrominance channel that are representative of the first image;
denoising the first chrominance channel using trilateral filtering in a manner that accounts for edge information in the luminance channel, edge information in the first chrominance channel, and edge information in the second chrominance channel by calculating a denoised chrominance value for each pixel of the first chrominance channel according to $$J_s^{C1} = \frac{\sum_{p=\Omega} g(\|p-s\|, \sigma_h) g(I_p^L - I_s^L, \sigma_i^L) g(I_p^{C1} - I_s^{C1}, \sigma_i^{C1}) g(I_p^{C2} - I_s^{C2}, \sigma_i^{C2}) I_p^{C1}}{\sum_{p=\Omega} g(\|p-s\|, \sigma_h) g(I_p^L - I_s^L, \sigma_i^L) g(I_p^{C1} - I_s^{C1}, \sigma_i^{C1}) g(I_p^{C2} - I_s^{C2}, \sigma_i^{C2})},$$

where
$I^{C1}$ is the first chrominance channel,
$\Omega$ is a region of pixels of the first chrominance channel that includes a pixel s,
p is a pixel located in the region of pixels $\Omega$,
$I_p^{C1}$ is a chrominance value in the first chrominance channel for the pixel p,
$I_p^L$ is a luminance value in the luminance channel for the pixel p,
$I_s^L$ is a luminance value in the luminance channel for the pixel s,
$I_p^{C1}$ is a chrominance value in the first chrominance channel for the pixel p,
$I_s^{C1}$ is a chrominance value in the first chrominance channel for the pixel s,
$I_p^{C2}$ is a chrominance value in the second chrominance channel for the pixel p,
$I_s^{C2}$ is a chrominance value in the second chrominance channel for the pixel s,
$J^{C1}$ is the denoised first chrominance channel image,
$J_s^{C1}$ is the calculated denoised chrominance value of the pixel s,
$\|p-s\|$ is an Euclidean distance between the pixel p and the pixel s,
$\sigma_h$ is a spatial falloff parameter,
$\sigma_i^L$ is an intensity falloff parameter for the luminance channel,
$\sigma_i^{C1}$ is an intensity falloff parameter for the first chrominance channel,
$\sigma_i^{C2}$ is an intensity falloff parameter for the second chrominance channel, and
g( ) is a Gaussian distribution;
denoising the second chrominance channel in a manner that accounts for edge information in the luminance channel, edge information in the first chrominance channel, and edge information in the second chrominance channel; and
converting the luminance channel, the denoised first chrominance channel, and the denoised second chrominance channel to a second set of data formatted according to the RGB color model that is representative of a second image.

8. The method of claim 7, further comprising:
processing the luminance channel; and
wherein said converting the luminance channel, the denoised first chrominance channel, and the denoised second chrominance channel to a second set of data formatted according to the RGB color model that is representative of a second image comprises
converting the processed luminance channel, the denoised first chrominance channel, and the denoised second chrominance channel to the second set of data formatted according to the RGB color model.

9. A system for reducing noise in an image, comprising:
a first color model converter configured to receive a first image as a first set of data formatted according to a red-green-blue (RGB) color model, and to convert the first set of data from the RGB color model to a second color model that includes at least a luminance channel, a first chrominance channel, and a second chrominance channel that are representative of the first image;
a first chrominance channel filter configured to denoise the first chrominance channel using modified joint bilateral filtering in a manner that accounts at least for edge information in the luminance channel by being configured to calculate a denoised chrominance value for each pixel of the first chrominance channel according to $$J_s^{C1} = \frac{\sum_{p=\Omega} g(\|p-s\|, \sigma_h) g(I_p^L - I_s^L, \sigma_i^L) I_p^{C1}}{\sum_{p=\Omega} g(\|p-s\|, \sigma_h) g(I_p^L - I_s^L, \sigma_i^L)},$$

where
$I^{C1}$ is the first chrominance channel,
$\Omega$ is a region of pixels of the first chrominance channel that includes a pixel s,
p is a pixel located in the region of pixels $\Omega$,
$I_p^{C1}$ is a chrominance value in the first chrominance channel for the pixel p,
$I_p^L$ is a luminance value in the luminance channel for the pixel p,
$I_s^L$ is a luminance value in the luminance channel for the pixel s,
$J^{C1}$ is the denoised first chrominance channel image,
$J_s^{C1}$ is the calculated denoised chrominance value of the pixel s,
$\|p-s\|$ is an Euclidean distance between the pixel p and the pixel s,
$\sigma_h$ is a spatial falloff parameter,
$\sigma_i^L$ is an intensity falloff parameter for the luminance channel, and
g( ) is a Gaussian distribution;

a second chrominance channel filter configured to denoise the second chrominance channel in a manner that accounts at least for edge information in the luminance channel; and a second color model converter configured to convert the luminance channel, the denoised first chrominance channel, and the denoised second chrominance channel to a second set of data formatted according to the RGB color model that is configured to form a second image.

10. The system of claim 9, further comprising:
a luminance channel processor configured to process the luminance channel; and
the second color model converter being configured to convert the processed luminance channel, the denoised first chrominance channel, and the denoised second chrominance channel to the second set of data formatted according to the RGB color model to form the second image.

11. The system of claim 9, further comprising:
a median filter configured to filter the luminance channel.

12. The system of claim 9, wherein the first chrominance channel filter is configured to denoise the first chrominance channel in a manner that accounts for edge information in the luminance channel and edge information in the first chrominance channel; and
the second chrominance channel filter is configured to denoise the second chrominance channel in a manner that accounts for edge information in the luminance channel and edge information in the second chrominance channel.

13. The system of claim 9, further comprising:
a median filter configured to filter the luminance channel.

14. A system for reducing noise in an image, comprising:
a first color model converter configured to receive a first image as a first set of data formatted according to a first color model from a chrominance-specific color model, and to convert the first set of data from the first color model to a second color model that includes at least a luminance channel, a first chrominance channel, and a second chrominance channel that are representative of the first image;
a first chrominance channel filter configured to denoise the first chrominance channel using modified dual bilateral filtering in a manner that accounts for edge information in the luminance channel and edge information in either the first chrominance channel or the second chrominance channel by being configured to calculate a denoised chrominance value for each pixel of the first chrominance channel according to $$J_s^{C1} = \frac{\sum_{p=\Omega} g(\|p-s\|, \sigma_h) g(I_p^L - I_s^L, \sigma_i^L) g(I_p^{C1} - I_s^{C1}, \sigma_i^{C1}) I_p^{C1}}{\sum_{p=\Omega} g(\|p-s\|, \sigma_h) g(I_p^L - I_s^L, \sigma_i^L) g(I_p^{C1} - I_s^{C1}, \sigma_i^{C1})},$$

where
$I^{C1}$ is the first chrominance channel,
$\Omega$ is a region of pixels of the first chrominance channel that includes a pixel s,
p is a pixel located in the region of pixels $\Omega$,
$I_p^{C1}$ is a chrominance value in the first chrominance channel for the pixel p,
$I_p^L$ is a luminance value in the luminance channel for the pixel p,
$I_s^L$ is a luminance value in the luminance channel for the pixel s,
$I_p^{C1}$ is a chrominance value in the first chrominance channel for the pixel p,
$I_s^{C1}$ is a chrominance value in the first chrominance channel for the pixel s,
$J^{C1}$ is the denoised first chrominance channel image,
$J_s^{C1}$ is the calculated denoised chrominance value of the pixel s,
$\|p-s\|$ is an Euclidean distance between the pixel p and the pixel s,
$\sigma_h$ is a spatial falloff parameter,
$\sigma_i^{C1}$ is an intensity falloff parameter for the luminance channel,
$\sigma_i^{C1}$ is an intensity falloff parameter for the first chrominance channel, and
g( ) is a Gaussian distribution;
a second chrominance channel filter configured to denoise the second chrominance channel in a manner that accounts for edge information in the luminance channel and edge information in either the first chrominance channel or the second chrominance channel; and
a second color model converter configured to convert the luminance channel, the denoised first chrominance channel, and the denoised second chrominance channel to a second set of data formatted according to the first color model that is configured to form a second image.

15. The method of claim 14, further comprising:
processing the luminance channel; and
wherein said converting the luminance channel, the denoised first chrominance channel, and the denoised second chrominance channel to a second image formatted according to the first color model comprises
converting the processed luminance channel, the denoised first chrominance channel, and the denoised second chrominance channel to the second image formatted according to the first color model.

16. The method of claim 14, further comprising:
median filtering the luminance channel; and
wherein said denoising the first chrominance channel using modified dual bilateral filtering in a manner that accounts for edge information in the luminance channel and edge information in either the first chrominance channel or the second chrominance channel comprises
denoising the first chrominance channel using modified dual bilateral filtering in a manner that accounts for edge information in the filtered luminance channel and edge information in either the first chrominance channel or the second chrominance channel; and
wherein said denoising the second chrominance channel in a manner that accounts for edge information in the luminance channel and edge information in either the first chrominance channel or the second chrominance channel comprises
denoising the second chrominance channel in a manner that accounts for edge information in the filtered luminance channel and edge information in either the first chrominance channel or the second chrominance channel.

17. The system of claim 14, further comprising:
a luminance channel processor configured to process the luminance channel; and
the second color model converter being configured to convert the processed luminance channel, the denoised first chrominance channel, and the denoised second chrominance channel to the second set of data formatted according to the first color model to form the second image.

18. The method of claim 14, further comprising:
median filtering the luminance channel; and
wherein said denoising the first chrominance channel using modified dual bilateral filtering in a manner that accounts for edge information in the luminance channel and edge information in either the first chrominance channel or the second chrominance channel comprises
denoising the first chrominance channel using modified dual bilateral filtering in a manner that accounts for edge information in the filtered luminance channel and edge information in either the first chrominance channel or the second chrominance channel; and
wherein said denoising the second chrominance channel in a manner that accounts for edge information in the luminance channel and edge information in either the first chrominance channel or the second chrominance channel comprises
denoising the second chrominance channel in a manner that accounts for edge information in the filtered luminance channel and edge information in either the first chrominance channel or the second chrominance channel.

19. A system for reducing noise in an image, comprising:
a first color model converter configured to receive a first image as a first set of data formatted according to a red-green-blue (RGB) color model, and to convert the first set of data from the RGB color model to a second color model that includes at least a luminance channel, a first chrominance channel, and a second chrominance channel that are representative of the first image;
a first chrominance channel filter configured to denoise the first chrominance channel using trilateral filtering in a manner that accounts for edge information in the luminance channel, edge information in the first chrominance channel, and edge information in the second chrominance channel by being configured to calculate a denoised chrominance value for each pixel of the first chrominance channel according to $$J_s^{C1} = \frac{\sum\limits_{p=\Omega} g(\|p-s\|,\sigma_h)g(I_p^L-I_s^L,\sigma_i^L)g(I_p^{C1}-I_s^{C1},\sigma_i^{C1})g(I_p^{C2}-I_s^{C2},\sigma_i^{C2})I_p^{C1}}{\sum\limits_{p=\Omega} g(\|p-s\|,\sigma_h)g(I_p^L-I_s^L,\sigma_i^L)g(I_p^{C1}-I_s^{C1},\sigma_i^{C1})g(I_p^{C2}-I_s^{C2},\sigma_i^{C2})},$$

where
$I^{C1}$ is the first chrominance channel,
$\Omega$ is a region of pixels of the first chrominance channel that includes a pixel s,
p is a pixel located in the region of pixels $\Omega$,
$I_p^{C1}$ is a chrominance value in the first chrominance channel for the pixel p,
$I_p^L$ is a luminance value in the luminance channel for the pixel p,
$I_p^L$ is a luminance value in the luminance channel for the pixel s,
$I_p^{C1}$ is a chrominance value in the first chrominance channel for the pixel p,
$I_s^{C1}$ is a chrominance value in the first chrominance channel for the pixel s,
$I_p^{C2}$ is a chrominance value in the second chrominance channel for the pixel p,
$I_s^{C2}$ is a chrominance value in the second chrominance channel for the pixel s,
$J^{C1}$ is the denoised first chrominance channel image,
$J_s^{C1}$ is the calculated denoised chrominance value of the pixel s,
$\|p-s\|$ is an Euclidean distance between the pixel p and the pixel s,
$\sigma_h$ is a spatial falloff parameter,
$\sigma_i^L$ is an intensity falloff parameter for the luminance channel,
$\sigma_i^{C1}$ is an intensity falloff parameter for the first chrominance channel,
$\sigma_i^{C2}$ is an intensity falloff parameter for the second chrominance channel, and
g( ) is a Gaussian distribution;
a second chrominance channel filter configured to denoise the second chrominance channel in a manner that accounts for edge information in the luminance channel, edge information in the first chrominance channel, and edge information in the second chrominance channel; and
a second color model converter configured to convert the luminance channel, the denoised first chrominance channel, and the denoised second chrominance channel to a second set of data formatted according to the RGB color model that is configured to form a second image.

20. The method of claim 19, further comprising:
capturing a third image in the form of a two-dimensional array of pixels arranged in a Bayer pattern; and
interpolating the two-dimensional array of pixels arranged in a Bayer pattern to form the first image formatted according to the RGB color model.

21. The system of claim 19, further comprising:
a luminance channel processor configured to process the luminance channel; and
the second color model converter being configured to convert the processed luminance channel, the denoised first chrominance channel, and the denoised second chrominance channel to the second set of data formatted according to the RGB color model to form the second image.

22. The method of claim 19, further comprising:
capturing a third image in the form of a two-dimensional array of pixels arranged in a Bayer pattern; and
interpolating the two-dimensional array of pixels arranged in a Bayer pattern to form the first image formatted according to the RGB color model.

* * * * *